(12) United States Patent
Takiguchi et al.

(10) Patent No.: US 7,121,706 B2
(45) Date of Patent: Oct. 17, 2006

(54) VEHICLE HEADLAMP UNIT

(75) Inventors: Tsutomu Takiguchi, Shizuoka (JP);
Keiichi Tajima, Shizuoka (JP); Atsushi Sugimoto, Shizuoka (JP); Kazuma Mochizuki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 270 days.

(21) Appl. No.: 10/758,419

(22) Filed: Jan. 15, 2004

(65) Prior Publication Data

US 2004/0208017 A1 Oct. 21, 2004

(30) Foreign Application Priority Data

| Jan. 17, 2003 | (JP) | ............... P. 2003-009434 |
| Jan. 17, 2003 | (JP) | ............... P. 2003-009435 |
| Jan. 20, 2003 | (JP) | ............... P. 2003-010626 |

(51) Int. Cl.
*F21V 19/02* (2006.01)
*B60Q 1/00* (2006.01)

(52) U.S. Cl. .............. 362/524; 362/272; 362/286
(58) Field of Classification Search ............ 362/284, 362/286, 287, 324, 419, 423, 425, 428, 514, 362/523, 524, 269, 272
See application file for complete search history.

(56) References Cited

U.S. PATENT DOCUMENTS 6,623,147 B1 * 9/2003 Hayami et al. ............. 362/524
2004/0085780 A1 * 5/2004 Hayami ..................... 362/523

FOREIGN PATENT DOCUMENTS

JP 2002-160581 6/2002

* cited by examiner

*Primary Examiner*—Y. My Quach-Lee
(74) *Attorney, Agent, or Firm*—Fish & Richardson P.C.

(57) ABSTRACT

In an actuator of a vehicle headlamp unit for deflecting a direction or a range of illumination, a step-like rib for supporting a printed circuit board is formed at an inner side of a peripheral edge portion of a resin molded casing, and an opposed rib is formed at an outer side of this peripheral edge portion by a generally channel-shaped groove. A gear in a gear mechanism of the actuator is made of a resin having self-lubricating properties. The actuator includes a brushless motor, a yoke molded of a resin having a cylindrical container-shape. A gear is formed integrally on a central portion of an outer end surface of the yoke. A fixing means for fixing the stator coil of the brushless motor to a housing or the board has a positioning structure for positioning the stator coil.

9 Claims, 20 Drawing Sheets

VEHICLE HEADLAMP UNIT

The present application claims foreign priority based on Japanese Patent Application Nos. P.2003-009434, P.2003-009435 and P.2003-010626, filed January 17, January 17 and January 20 of 2003, respectively, the contents of which are incorporated herein by reference.

BACKGROUND OF THE INVENTION

1. Field of the Invention

This invention relates to a headlamp unit for a vehicle such as an automobile, and more particularly to the structure of an actuator for deflecting an optical axis of a headlamp used in a headlamp unit that has luminous distribution control means (for example, but not by way of limitation, an adaptive front-lighting system (hereinafter referred to as "AFS")) for changing the direction and range of illumination by the headlamp, in accordance with a running condition.

This invention further relates to a brushless motor in the above actuator, and more particularly to a brushless motor with a reduced number of component parts, and which can be easily assembled, thereby achieving a low-cost and lightweight design.

2. Background of the Related Art

In a proposed related art AFS illustrated in FIG. 1, to enhance a running safety of an automobile, information representative of a running condition of an automobile CAR is detected by sensors 1, and detection outputs of these sensors 1 are sent to an electronic control unit (hereinafter referred to as "ECU") 2. For example, the sensors 1 include a steering sensor 1A for detecting a steering angle of a steering wheel SW of the automobile CAR, a speed sensor 1B for detecting the speed of the automobile CAR, and leveling sensors 1C (for simplicity, only the sensor for a rear axle is shown) for respectively detecting the heights (or levels) of the front and rear axles so as to detect a horizontal condition (leveling) of the automobile CAR. These sensors 1A, 1B and 1C are connected to the ECU 2.

In accordance with the outputs of the sensors 1 inputted thereto, the ECU 2 controls swivel lamps 3R and 3L (that is, headlamps 3 each capable of deflecting an illuminating direction right and left to change its luminous distribution characteristics) provided respectively at right and left portions of the front of the automobile.

In one related art example of the swivel lamp 3R, 3L, a reflector and a projector lamp are provided within the headlamp, and can be angularly moved horizontally. These lamps 3R, 3L are driven for rotation by a drive power source (such as a drive motor) through rotation drive means. Here, a mechanism, including this rotation drive source, is referred to as an actuator. When a car travels along a curved road, this kind of AFS enables the headlamps to illuminate a road ahead of the curve in accordance with the running speed of the car, and therefore the AFS is effective in enhancing the running safety of the car.

In another related art proposal, an actuator is provided in which a drive motor serving as a drive power source and a gear mechanism serving as rotation drive means are mounted within a casing. Also provided is a circuit means (for controlling the rotation of the drive motor) within the above casing. In such an actuator, to achieve a lightweight and low-cost casing design and enhance the ability of mounting the casing within the lamp and enhance the reliability of the operation of the gear mechanism mounted within the casing, a relatively inexpensive glass fiber-containing PBT resin, which has high flexural rigidity and good heat resistance, is used as a material for forming the casing.

Although a plurality of gears, forming the gear mechanism mounted within the casing, are usually made of a metal material, the related art scheme forms these gears by a resin material to achieve the lightweight design and low-cost design of the actuator. In this case, a thermosetting resin, such as a phenolic resin that can be highly precisely molded, or a resin such as a polyacetal resin, is used. Grease is coated on the gears to provide lubricitation between the adjacent gears.

In such a related art actuator, a brushless motor is used as the drive motor. The brushless motor is not provided with a so-called commutator formed by brushes and a moving contact, and is advantageous in that it can be formed into a compact and lightweight construction. Such a brushless motor is used, for example, as a drive source of a rotation drive device for deflecting an optical axis of a vehicle lamp described in JP-A-2002-160581 (Japanese Patent Application Publication Number: 2002-160581, the contents of which is incorporated herein by reference).

More specifically, FIG. 20 shows a related art cross-sectional view of an outer rotor-type brushless motor. Identical reference numerals in this Figure and other Figures of preferred embodiments (described later) of the invention denote corresponding portions. A thrust bearing 421 and a sleeve bearing 422 are fitted in a hollow boss 414 formed on an equipment housing 41, and a rotation shaft 423 is rotatably inserted in this sleeve bearing 422. A stator coil 424 is fixedly mounted on the hollow boss 414, and is disposed above a printed circuit board 45 provided within the housing 41. A cylindrical container-like rotor 426 is mounted on the rotation shaft 423, and is rotatably disposed around the stator coil 424. In the stator coil 424, a plurality of coils 4243 are wound on a petal-shaped core 4241 such that the coils 4243 are arranged in a circumferential direction to produce a plurality of magnetic poles in the circumferential direction.

The core 4241 is fitted at its central hole 4244 on the outer periphery of the hollow boss 414, and therefore is supported by this hollow boss 414. Terminals 4243a of the coils 4243 are electrically connected to the printed circuit board 45, and an alternating current, for example, a three-phase alternating current, is supplied to these coils through the printed circuit board 45.

In the rotor 426, an annular rotor magnet 428 is mounted within a cylindrical container-like metal yoke 427, as shown in FIG. 21, which is an exploded, cross-sectional view. A plurality of S-poles and N-poles are alternately magnetized in the rotor magnetic 428 in a circumferential direction. The rotation shaft 423 is integrally connected to the yoke 427 through a bushing 4272 fitted in a central hole 4271 in this yoke. A gear 441 for transmitting a rotational force to the exterior is fixedly mounted on a distal end portion of the rotation shaft 423.

In this brushless motor, when a three-phase current is supplied to the stator coil 424, S-poles and N-poles are alternately produced at a plurality of portions of the core 4241 of the stator coil 424 in the circumferential direction. Therefore, a magnetic force produced between this stator core and the circumferentially-arranged S-poles and N-poles of the rotor magnet 428 changes based on the phase of the three-phase current. The rotor magnet 428 and the yoke 427, integrally connected thereto, are rotated by this magnetic force. When the yoke 427 thus rotates, the rotation shaft 423 rotates together with this yoke. As a result, the gear 441, fixedly mounted on the distal end portion of this rotation shaft, is rotated. In the brushless motor, the stator coil 424 for supplying electric power is fixed, and therefore, there is no need to provide a commutator for changing the direction of a current flowing through the coils. This related art design is advantageous in achieving a compact and lightweight design of the motor.

For assembling the related art brushless motor, the stator coil 424, having the coils 4243 wound on the core 4241, is mounted on a predetermined portion of the printed circuit board 45. Then, the terminals 4243*a* of the coils 4243 are connected to electrodes on the printed circuit board 45 by soldering or the like, and the stator coil 424 is supported above the printed circuit board 45 in a floating condition. Then, the printed circuit board 45 is mounted within the housing 41. At this time, the stator coil 424 is fitted on the outer periphery of the hollow boss 414 of the housing 41.

On the other hand, in the rotor 426, the bushing 4272 is fitted into the central hole 4271 of the yoke 427 having the rotor magnet 428 mounted therein, and then the yoke is press-fitted on the rotation shaft 423 through the bushing 4272, and is fixed to the rotation shaft 424. Then the gear 441 is press-fitted on the distal end portion of the rotation shaft 423. Then, the thrust bearing 421 and the sleeve bearing 422 are fitted into the hollow boss 414 from the upper side of the printed circuit board 45, and also the proximal end portion of the rotation shaft 423 is inserted into the sleeve bearing 422, so that the rotation shaft 423 is borne by these bearings. As a result, the rotor 426 is mounted in a manner to cover the stator coil 424, so that the assemblage of the brushless motor is completed.

In the above related art actuator for the AFS, it has been proposed to form the casing and the gears of the gear mechanism, using a resin. However, the related has various problems and disadvantages. For example, but not by way of limitation, when the casing is molded of a glass fiber-containing PBT resin suited for casing, warp is liable to develop in this resin-molded casing. Therefore the distance between axes of adjacent gears of the contained gear mechanism varies, which invites problems such as inaccurate meshing of the gear train, the production of abnormal sounds and the development of a slip between the meshed gears, thus preventing the proper operation of the gear mechanism.

To prevent such warp of the casing, it may be proposed to form a rib (counter-rib) integrally on and along a peripheral edge portion of the casing, the rib projecting from an outer surface of the casing away from its adjacent bent portion. However, the counter-rib projects several millimeters from the outer surface of the casing, and therefore the outer size of the casing is increased by this rib. Further, this invites a problem in that the size of the actuator is increased, so that the ability of mounting the actuator within the lamp is lowered.

Further, in the related art, wear resistance of the meshed gears is secured by the grease applied to the gears to provide lubrication therebetween. However, when the actuator, mounted within the lamp, is heated by the lamp so that its temperature rises, the grease evaporates and is dissipated to the exterior of the casing. The dissipated grease deposits on a surface of lens of the lamp, and is solidified to fog the lens, thus inviting a so-called grease-fogging problem. Particularly in recent lamps, a transparent lens (outer cover) has been extensively used therefore, the fogging by the grease is a cause for deteriorating the quality of the lamp.

Further, in the related art brushless motor, the rotor 426 comprises the yoke 427, the rotor magnet 428, the bushing 4272, and the gear 441. therefore, the number of the component parts is relatively large. Further, when assembling the rotor 426, the bushing 4272 is press-fitted into the yoke 427 to be integrally connected thereto, and the rotation shaft 423 is passed through the bushing 4272 in a press-fitted condition. Further, the gear 441 is press-fitted on the rotation shaft 423 to be fixed thereto.

As a result, the operations using the press-fitting apparatus, are required, and much time and labor are required for the assembling operation, and the overall cost, including the cost of the parts and the cost of the motor-assembling operation, increases, and therefore it is difficult to achieve the low cost-design of the motor. In addition, press-fitting margins for the purpose of press-fitting the parts need to be provided on the rotation shaft 423 in the axial direction, and it is difficult to reduce the axial dimension of the rotation shaft.

Furthermore, the bushing 4272, the yoke 427 and the gear 441 are made of metallic materials, respectively, and this is a barrier to the lightweight design. Particularly, the yoke 427, made of metal, has an increased weight, and therefore an inertia moment of the rotor 426 is liable to become large, which causes the vibration of the rotor when it rotates at high speed. Furthermore, when the precision of assembling of the bushing 4272, yoke 427 and gear 441 relative to the rotation shaft 423 is low, the yoke 427 and the gear 441 fail to rotate in a common plane relative to the rotation shaft 423, and this causes the rotation balance to be disturbed, so that rotation characteristics are lowered.

Also, the related art brushless motor is of such a construction that the stator coil 424 is fitted on the outer periphery of the hollow boss 414. therefore, it is difficult to highly precisely set the stator coil 424 in its fitted position relative to the hollow boss 414 in both the circumferential direction and directions of this hollow boss. And besides, the stator coil 424, after being fitted on the hollow boss 414, is liable to be moved around the hollow boss 414 by vibrations and an impact. As a result of this movement, the stator coil 424 may be displaced out of position. Thus, misregistration may develop between the rotor 426 and the stator coil 424, and the intended magnetic force may fail to be produced between the stator coil 424 and the rotor magnet 428 of the rotor 426. The foregoing situation leads to a problem that the rotational force of the motor is lowered.

Furthermore, when mounting the stator coil 424 on the printed circuit board 45, the terminals 4243*a* of the coils 4243 are soldered to the electrodes on the printed circuit board. However, this operation is effected, utilizing a gap formed between the stator coil 424 and the printed circuit board 45, and therefore the soldering operation is difficult and requires meticulous attention.

SUMMARY OF THE INVENTION

It is an object of this invention to provide a vehicle headlamp unit in which the above various problems, encountered when the parts of the actuator are made of a resin, are solved. However, the present invention does not need to overcome the related art problems, and may not overcome any problems or disadvantages at all.

It is another object of this invention to provide a brushless motor which has a reduced number of component parts, and can be easily assembled, thereby achieving a low-cost and lightweight design.

According to the present invention, there is provided a vehicle headlamp unit comprising luminous distribution control means for controlling a direction or a range of illumination by light from a light source, and an actuator for driving the luminous distribution control means; wherein the actuator includes a resin-molded casing in which component parts, including a gear mechanism and a board, are contained; and a step-like rib for supporting the component parts is formed at an inner side of a peripheral edge portion of the casing to increase a thickness of the peripheral edge portion, and an opposed rib is formed at an outer side of the peripheral edge portion, and extends along a generally channel-shaped groove recessed toward the step-like rib. In the invention, preferably, at least part of a plurality of gears, forming the gear mechanism, is made of a resin having self-lubricating properties.

In the invention, the casing of the actuator is molded of a resin, and therefore the lightweight design and low-cost design can be achieved. The step-like rib is formed at the inner surface of the casing, and the channel-shaped groove is formed in the outer surface of the casing to provide the opposed rib. Therefore, in the resin-molding of the casing, an uneven flow of the resin in a region for forming the peripheral edge portion is prevented, and as a result warp of the casing is suppressed. The step-like rib supports the component part, and the opposed rib does not project beyond the outer surface of the casing. Therefore, there is no need to provide an additional support member for supporting this component part, and the board can be fixedly supported directly by the casing, and therefore the outer size of the casing will not increase with the provision of a counter-rib, and therefore the casing can be formed into a compact design. The gear of the gear mechanism is made of the self-lubricating resin, and therefore the gear mechanism does not need to be provided with grease, and the fogging of the lamp due to grease is prevented.

Further, according to the invention, there is provided a brushless motor comprising a fixedly-supported stator coil, a rotor including a yoke which supports a rotor magnet provided around the stator coil, and is connected to a rotation shaft, and a gear which is connected to the rotation shaft, and is in mesh with a gear mechanism; wherein the yoke and the gear are formed integrally with each other, and are made of a resin. In the brushless motor of the invention, preferably, the yoke has a cylindrical container-shape, and the rotor magnet of an annular shape is mounted on an inner peripheral surface of the yoke, and the gear is formed integrally on a central portion of an outer end surface of the yoke, and a shaft hole is formed through the gear, and extends along a centerline of the gear, and the rotation shaft is passed through the shaft hole in a fitted condition.

In the invention, the yoke of the rotor and the gear in the brushless motor are formed integrally with each other, using the resin, and these are supported on the rotation shaft in a fitted condition. Therefore, the number of the component parts of the rotor is reduced, and the time and labor, required for assembling the rotor, are reduced. As a result, the cost of the parts and the cost of the assembling operation are reduced, so that the low-cost design of the motor can be achieved. And besides, press-fitting margins for the purpose of press-fitting the relevant parts do not need to be provided on the rotation shaft, and therefore the axial dimension of the rotation shaft can be reduced, which is advantageous in achieving the compact design. Furthermore, the yoke and the gear are made of the resin, and therefore the lightweight design can be achieved, and this also prevents the vibration during the high-speed rotation, so that a rotation balance can be improved, thereby enhancing the rotation characteristics.

Further, according to the invention, there is provided a brushless motor comprising a fixedly-supported stator coil, and a rotor including a yoke which is connected to a rotation shaft in a supported manner, and supports a rotor magnet provided around the stator coil; wherein there is provided fixing means for fixing the stator coil to a housing or a board, and the fixing means has a positioning structure for positioning the stator coil.

More specifically, there is provided a core base which is integrally connected to a core of the stator coil, and supports the stator coil on a board, and the core base includes engagement means for integrally connecting the core base to the core, and terminals for supporting the core base on the board and for electrically connecting coils, wound on the core, to the board. Alternatively, the stator coil can be fitted on a boss which is formed at the housing, and supports the rotation shaft, and the boss includes means for positioning the stator coil in a circumferential direction and an axial direction, and engagement means for holding the core of the stator coil against movement in an axial direction of the boss.

In the invention, before the stator coil is mounted on the board, the core base is beforehand integrally connected to the core, and terminals of the coils are connected to the terminals, and then the terminals of the core base are connected to the board, thereby mounting the stator coil on the board. With this construction, the stator coil can be easily mounted on the board, and also the positioning of the stator coil relative to the board can be effected highly precisely by the core base, so that the stator coil can be stably and highly precisely mounted relative to the rotor.

In the invention, when the stator coil is fitted on the boss, the positioning of the stator coil is effected by the positioning means for positioning it in the circumferential and axial directions, and the stator coil is supported on the boss through the engagement means. Therefore, the mounting of the stator coil can be effected easily, and besides the stator coil can be highly precisely located relative to the boss, and can also be highly precisely located relative to the rotor mounted on the boss.

BRIEF DESCRIPTION OF THE DRAWINGS

The above and other objects and advantages of the present invention will become more apparent by describing in detail exemplary, non-limiting embodiments thereof with reference to the accompanying drawings, wherein like reference numerals designate like or corresponding parts throughout the several views, and wherein.

DESCRIPTION OF THE PREFERRED EMBODIMENTS

An exemplary, non-limiting preferred embodiment of the present invention will now be described with reference to the drawings.

<First Embodiment>

Figure 2:
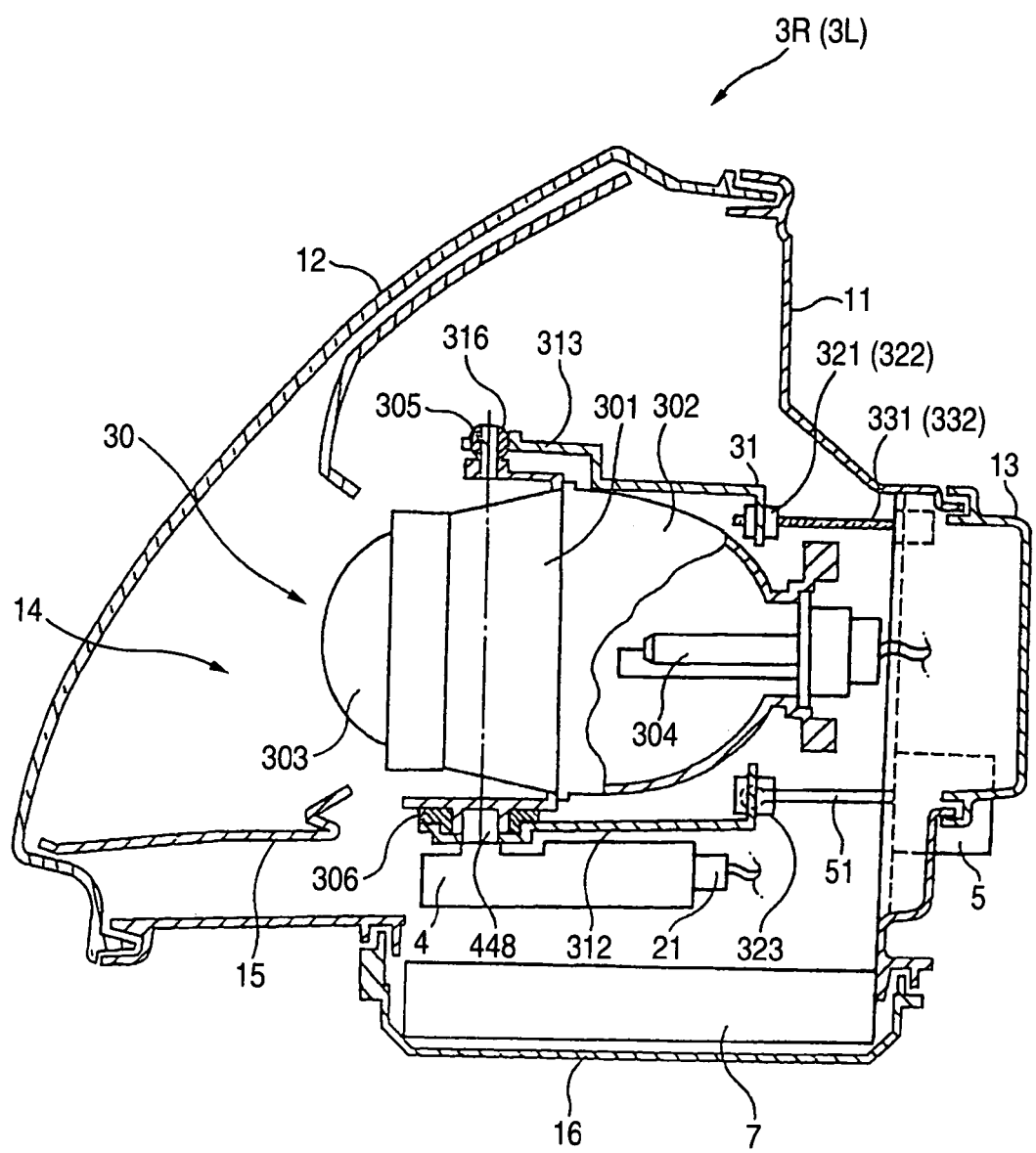
FIG. 2 is a vertical cross-sectional view of a swivel lamp according to an exemplary, non-limiting embodiment of the present invention.
Figure 3:
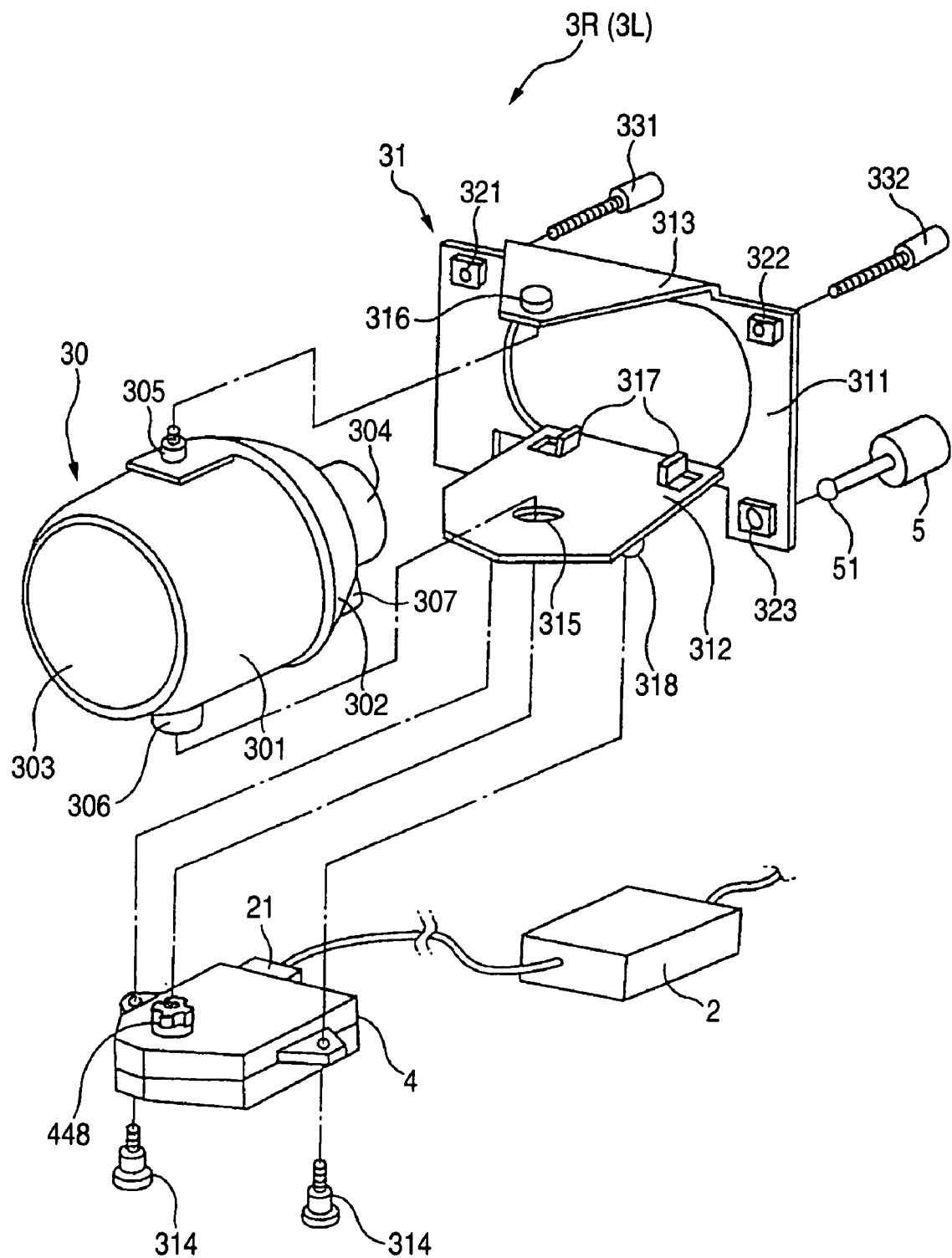
FIG. 3 is an exploded, perspective view showing an internal structure of the swivel lamp according to an exemplary, non-limiting embodiment of the present invention.

FIG. 2 shows an internal structure of a vertical cross-sectional view of a headlamp 3 (comprising a swivel lamp 3R or 3L, capable of deflecting an illuminating direction right and left, the swivel lamp being a constituent element of an AFS serving as lamp deflection angle control means of the invention) Further, FIG. 3 is a partly-exploded, perspective view of a main portion thereof. A lens 12 is attached to a front open portion of a lamp body 11, and a rear cover 13 is attached to a rear open portion thereof, thereby forming a lamp chamber 14.

A projector lamp 30 is provided within the lamp chamber 14. The projector lamp 30 includes a sleeve 301, a reflector 302, a lens 303, and a light source 304, which are combined together into a unit. This kind of projector lamp has already been extensively used, and therefore detailed description thereof will be omitted here. A discharge bulb is used as the light source 304.

The projector lamp 30 is supported by a generally u-shaped bracket 31. An extension 15 is provided around the projector lamp 30 in the lamp body 11 to prevent the interior of the lamp from being viewed through the lens 12. In this embodiment, a lighting circuit 7 for lighting the discharge bulb 304 of the projector lamp 30 is mounted in the lamp by a lower cover 16 attached to a lower open portion of the lamp body 11.

The projector lamp 30 is supported by the bracket 31 such that this projector lamp 30 is interposed between a lower plate 312 and an upper plate 313, which extend substantially perpendicularly from a vertical plate 311 of the bracket 31. An actuator 4 (described later) is fixedly secured to a lower side of the lower plate 312 by screws 314, and a rotation output shaft 448 of the actuator 4 projects upwardly through a shaft hole 315 formed through the lower plate 312. The screws 314 are screw-fastened respectively to bosses 318 formed on the lower surface of the lower plate 312. A shaft portion 305, formed on an upper surface of the projector lamp 30, is fitted in a bearing 316 provided on the upper plate 313, and a connecting portion 306, provided on a lower surface of the projector lamp 30, is fitted on the rotation output shaft 448 of the actuator 4, and is connected thereto.

With this construction, the projector lamp 30 can be angularly moved right and left relative to the bracket 31, and when the actuator 4 is operated, the projector lamp 30 is angularly moved in a horizontal direction together with the rotation output shaft 448.

Aiming nuts 321 and 322 are fixedly mounted respectively on upper left and right portions of the bracket 31 (as viewed from the front side), while a leveling bearing 323 is fixedly mounted on a lower left portion of the bracket. A horizontal aiming screw 331 and a vertical aiming screw 332, which are threadably supported on the lamp body 11, are threaded into the aiming nuts 321 and 322, respectively. A leveling ball 51 of a leveling mechanism 5, supported on the lamp body 11, is fitted in the leveling bearing 323.

With this construction, by threading the horizontal aiming screw 331, the bracket 31 can be angularly moved in the horizontal direction about an axis passing through the right aiming nut 322 and the leveling bearing 323. By threading the horizontal aiming screw 331 and the vertical aiming screw 332 at the same time, the bracket 31 can be angularly moved upward and downward about the leveling bearing 323.

When the leveling mechanism 5 is operated, the leveling ball 51 is moved forward and backward in an axial direction, and by doing so, the bracket 31 can be angularly moved upward and downward about an axis passing through the left and right aiming nuts 321 and 322. With this construction, the aiming adjustments for adjusting the optical axis of the projector lamp 30 in the left and right directions and the upward and downward directions can be effected, and also there can be effected the leveling adjustment for adjusting the optical axis of the projector lamp in the upward and downward directions in accordance with a leveling condition changing with a change of a car height.

A projection 307 is formed on a lower surface of the reflector 302 of the projector lamp 30, and a pair of stamped-out stoppers 317 are formed respectively at left and right sections of that portion of the lower plate 312 (of the bracket 31) generally opposed to the projection 307. When the projector lamp 30 is angularly moved, the projection 307 is brought into engagement with one of the stoppers 317, thereby limiting the range of angular movement of the projector lamp 30.

Figure 4:
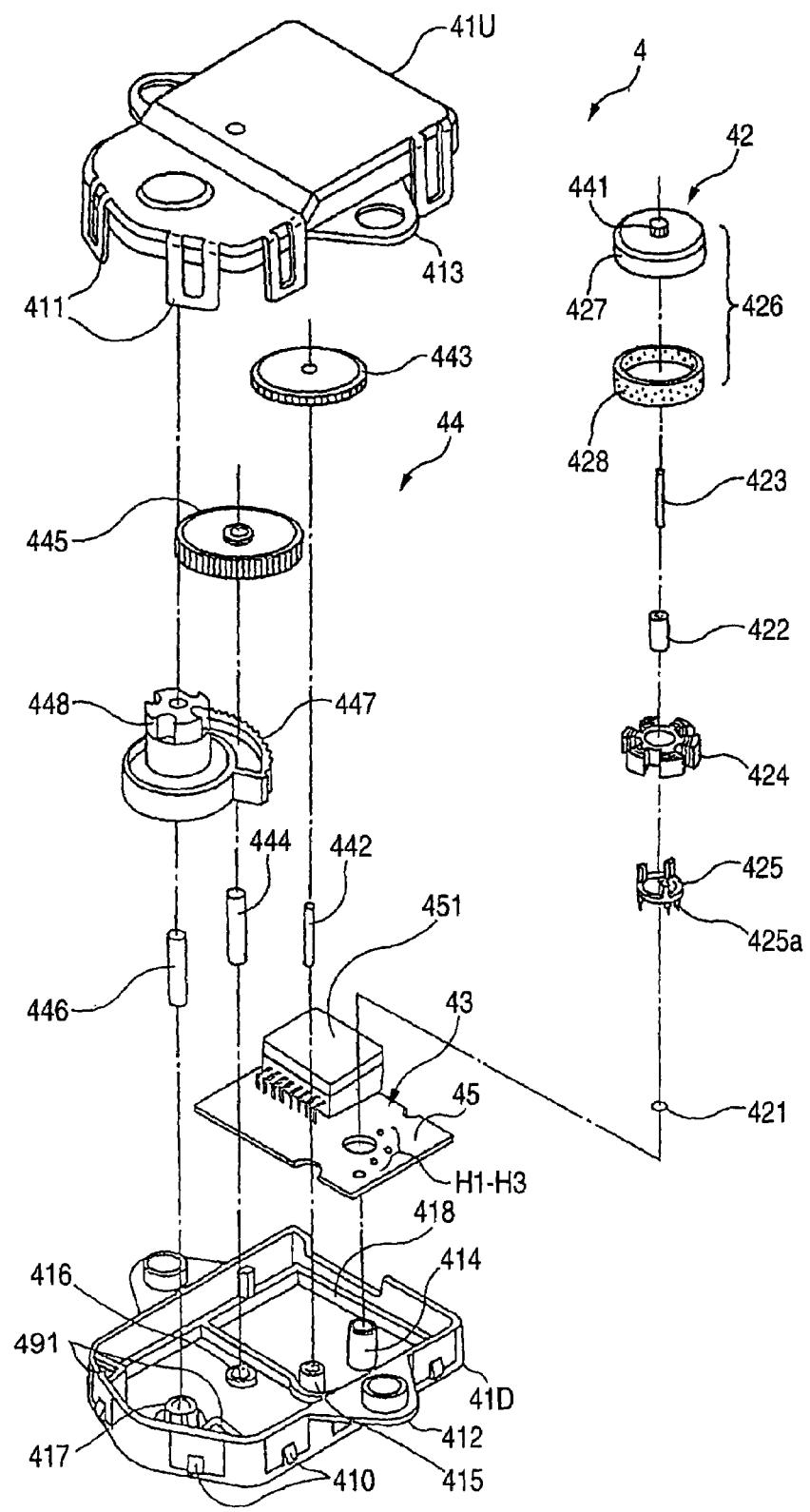
FIG. 4 is a partly-exploded, perspective view of an actuator according to an exemplary, non-limiting embodiment of the present invention.
Figure 5:
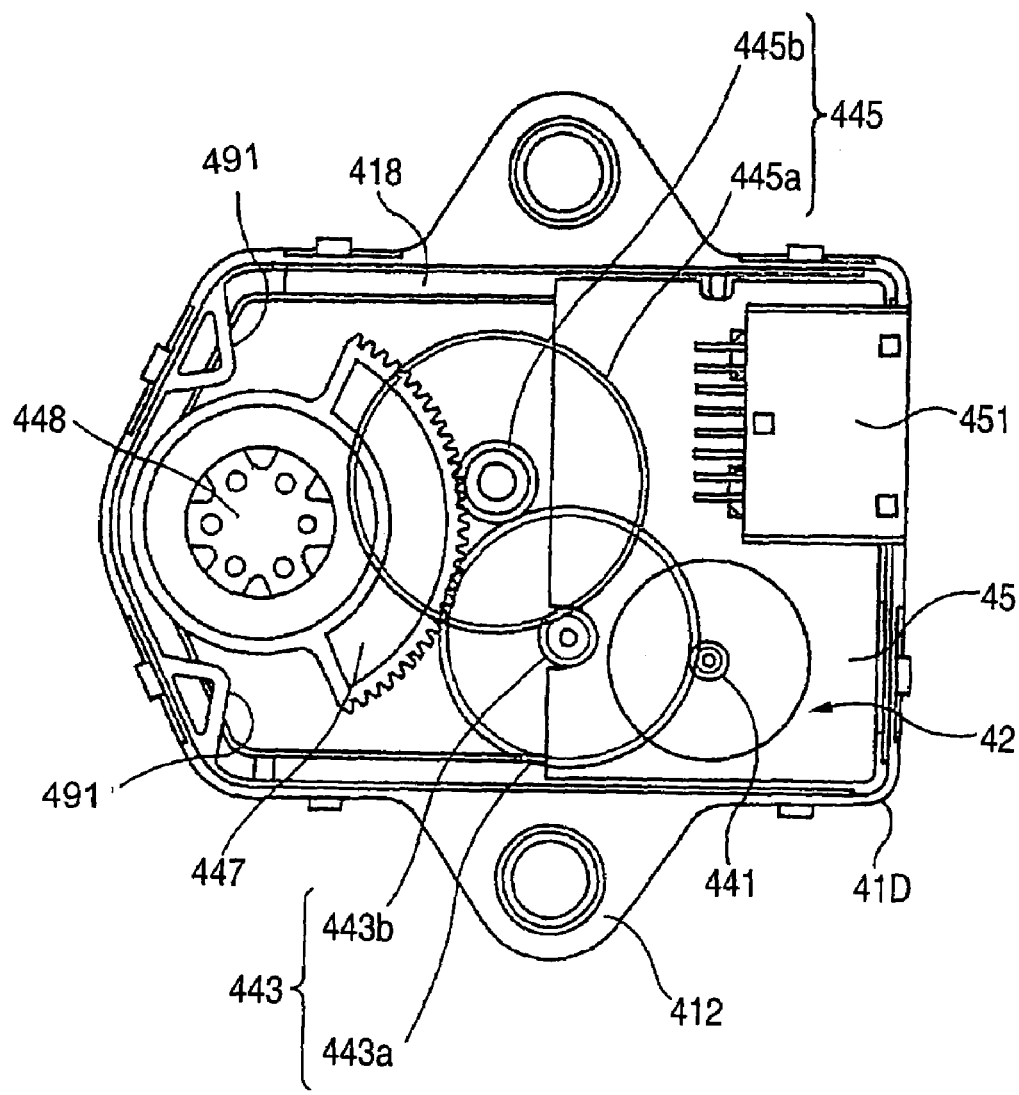
FIG. 5 is a plan view of the actuator according to an exemplary, non-limiting embodiment of the present invention.
Figure 6:
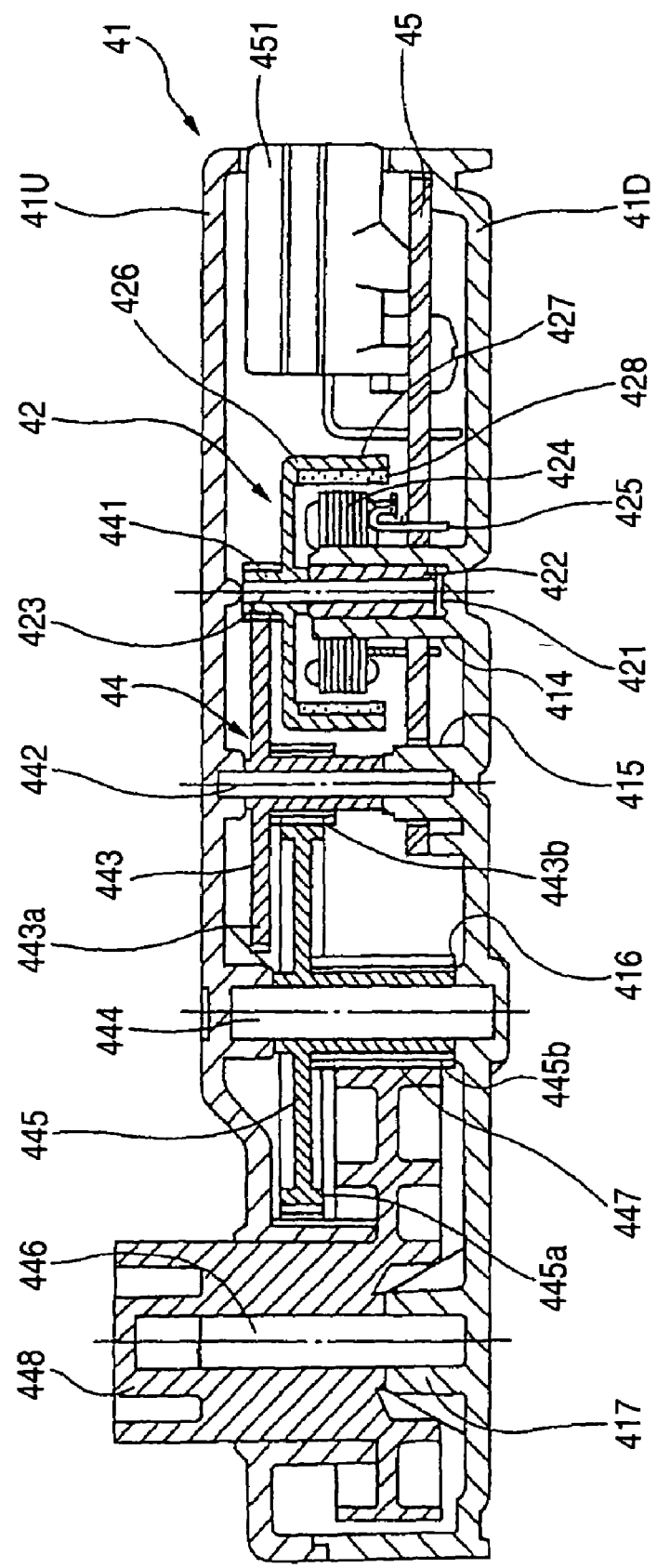
FIG. 6 is a vertical cross-sectional view of the actuator according to an exemplary, non-limiting embodiment of the present invention.
Figure 16A:
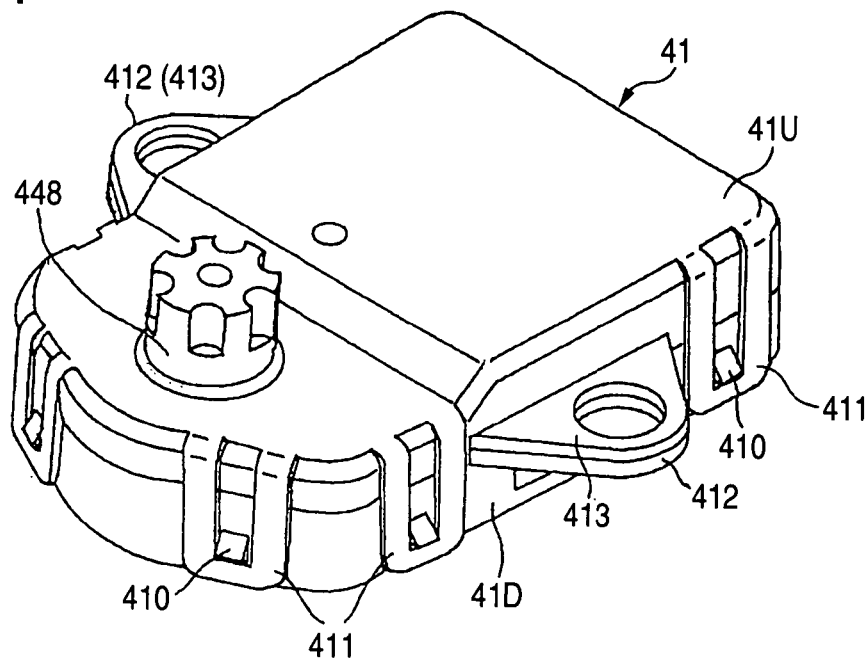
FIGS. 16A and 16B are perspective views of a casing, showing its appearance respectively from the upper side and the lower side according to an exemplary, non-limiting embodiment of the present invention.
Figure 16B:
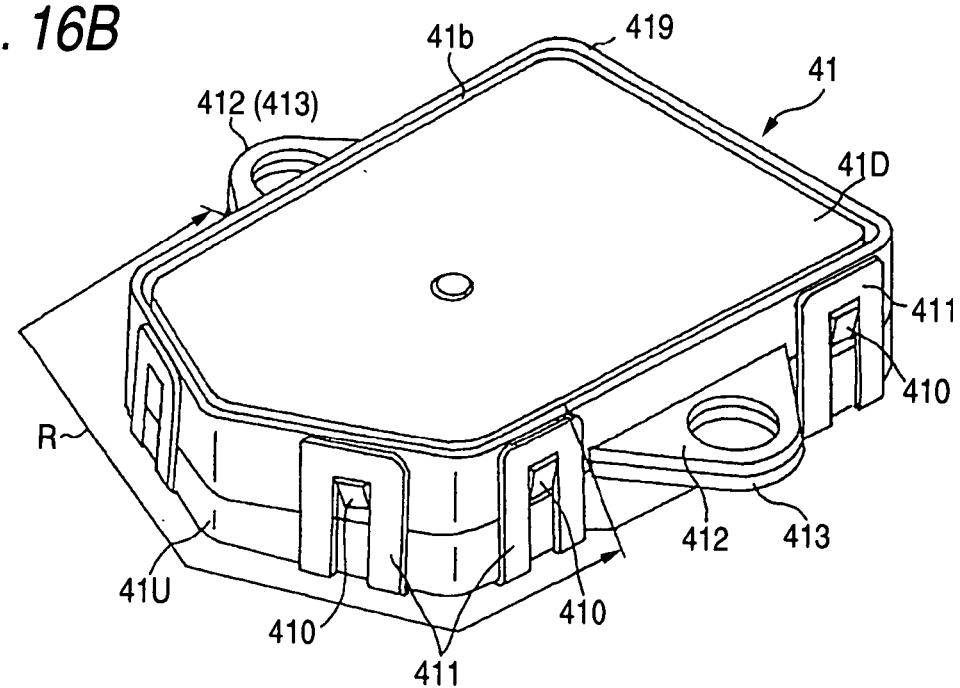

FIG. 4 is an exploded, perspective view of a main portion of the actuator 4 for swiveling the swivel lamp 3R, 3L, and FIG. 5 is a plan view showing the construction of the actuator in its assembled condition. FIG. 6 is a vertical cross-sectional view thereof. A casing 41 is formed by a lower half portion 41D and an upper half portion 41U, each having a generally-pentagon dish-like shape. Each of the two half portions 41D and 41U is molded of a glass fiber-containing PBT resin. A plurality of projections 410, formed on a peripheral surface of the lower half portion 41D, are fitted respectively in a plurality of fitting piece portions 411 extending downwardly from a peripheral surface of the upper half portion 41U. Therefore, the upper half portion 41U is placed on the lower half portion 41D, and then when the upper half portion 41U is pressed toward the lower half portion 41D, the fitting piece portions 411 are fitted on the projections 410, respectively, so that the two half portions are firmly combined together to form a casing chamber therein as shown in FIGS. 16A and 16B (which are perspective views of the assembled casing 41, showing its appearance respectively from the upper side and the lower side). At the same time, the assembling of the casing 41 can be easily effected with a one-touch operation. [0013 (626)] ([0015 (435)] [0016 (434)]

Figure 17:
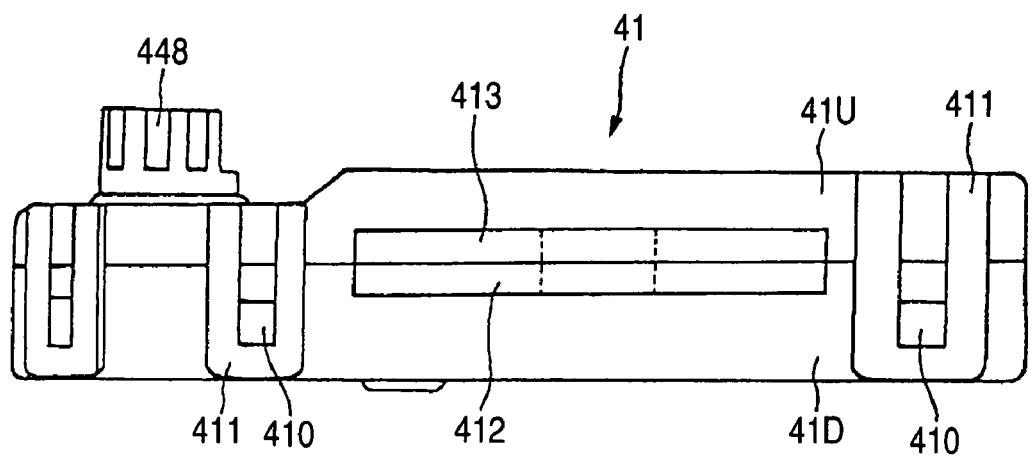
FIG. 17 is aside-elevational view of the casing according to an exemplary, non-limiting embodiment of the present invention.

FIG. 17 is a side-elevational view of the casing 41 in its assembled condition. Support piece portions 413 are formed on, and project from, opposite side surfaces of the upper half portion 41U, respectively, while support piece portions 412 are formed on and project from opposite side surfaces of the lower half portion 41D, respectively. These support piece portions 412 and 413 are used to fix the casing 41 to the bracket 31 through the screws 314 as described above. Thus, each mating pair of support piece portions 412 and 413 are combined, and fixed to the boss 318. Therefore the fitted condition of each fitting piece portion 411 relative to the corresponding projection 410 is maintained, so that the overall strength of the casing 41 increases.

The rotation output shaft 448, having splines, projects from the upper surface of the pentagonal casing 41 at one end portion thereof corresponding to an apex side of the pentagonal shape, and is connected to the connecting portion 306 provided at the bottom surface of the projector lamp 30. A connector 451 is provided at an inner side of the other end of the casing 41 corresponding to a bottom side of the pentagonal shape. An external connector 21 (see FIGS. 2 and 3), connected to an ECU2, is adapted to be fittingly connected to the connector 451.

When the casing 41 is fixed to the bracket 31 through the support piece portions 412 and 413, the casing 41 is fixed to the bracket 31 at a region disposed generally at a middle point of a line interconnecting the rotation output shaft 448 and the connector 451. Therefore, even when a rotational drive force is applied to the rotation output shaft 448 and when a fitting force for fitting the external connector 21 to the connector 45 is applied to the connector 45, the casing 41 can keep a stable posture, and the smooth and accurate angular movement of the projector lamp 30 by the rotation output shaft 448 can be achieved.

Four hollow bosses 414, 415, 416 and 417 are formed upright respectively on predetermined portions of an inner bottom surface of the lower half portion 41D of the casing 41. A brushless motor 42 (described later), serving as a drive motor, is assembled on the first hollow boss 414. Shafts of a gear mechanism 44 (described later) are inserted and supported in the second to fourth hollow shafts 415, 416 and 417, respectively.

A step-like rib 418 is formed integrally on a peripheral edge portion of the inner bottom surface of the lower half portion 41D over an entire periphery thereof. A printed circuit board 45 is placed at its peripheral edge portion on the step-like rib 418, and the printed circuit board 45 is mounted and supported within the casing 41 such that the printed circuit board 45 is held between the step-like rib 418 and a downwardly-directed rib (not shown) formed on the upper half portion 41U. The first hollow boss 414 passes through the printed circuit board 45, and the assembled brushless motor 42 is electrically connected to the printed circuit board 45. Various electronic parts (not shown) of a control circuit 43 (described later) and the connector 451 are mounted on the printed circuit board 45.

Figure 18:
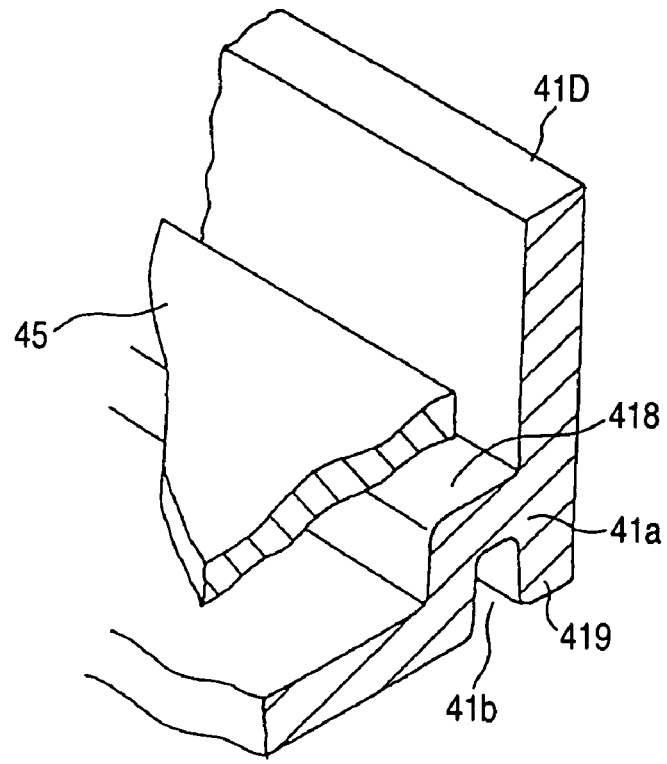
FIG. 18 is a fragmentary perspective view showing a portion of the casing according to an exemplary, non-limiting embodiment of the present invention.

As shown in FIG. 6 and FIG. 18 (which is a fragmentary perspective view of the casing 41), the peripheral edge portion 41a of the lower half portion 41 has an increased thickness as a result of the provision of the step-like rib 418. A narrow channel-shaped groove 41b is formed in the bottom surface of the peripheral edge portion 41a, and extends along the step-like rib 418. As a result of the formation of the channel-shaped groove 41b, an opposed rib 419, opposed to the step-like rib 418, is formed at a region disposed outwardly of the channel-shaped groove 41b. The thickness of the opposed rib 419 is substantially equal to a wall thickness of the lower half portion 41D.

In this embodiment, that portion of the channel-shaped groove 41b, disposed at the region where the step-like rib 418 supports the printed circuit board 45, is relatively deep. However, the other portion of the channel-shaped rib 41b, disposed at a region R (see FIG. 16) where the step-like rib 418 does not support the printed circuit board 45, is shallower. Thus, the thickened condition of the peripheral edge portion 41a is relieved by the channel-shaped groove 41b, and the opposed rib 419 is formed by part of the groove portion. With this construction, when the lower half portion 41D is to be resin-molded by a mold, an uneven flow of the resin in a region for forming the peripheral edge portion 41a is prevented, and as a result warp at the peripheral edge portion 41a of the lower half portion 41D is suppressed.

The opposed rib 419, formed as a result of the formation of the channel-shaped groove 41b, has such a height that its outer edge is disposed substantially flush with the bottom surface of the lower half portion 41D. Therefore, the opposed rib 419 does not project beyond the outer surface of the lower half portion 41D in contrast with the above-mentioned counter-rib, and the outer size of the lower half portion 41D will not increase, and the lower half 41D and hence the casing 41 can be formed into a compact design. Incidentally without the channel-shaped groove 41b, a flow of the resin concentrates on the thickened peripheral edge portion 41a of the lower half portion 41D during the resin-molding operation, so that the flow of the resin becomes uneven. In that case, after the molding, warp may develop at the lower half portion 41D, and also sinks may develop in the surface thereof.

In the brushless motor 42, a rotation shaft 423 is rotatably supported in the first hollow boss 414 of the lower half portion 41D through a thrust bearing 421 and a sleeve bearing 422. A stator coil 424, including three pairs of coils equally spaced in a circumferential direction, is fixedly mounted on the printed circuit board 45 which is supported on the lower half portion 41D, with the first hollow boss 414 passing therethrough. The stator coil 424 is electrically connected to the printed circuit board 45 so as to be supplied with electric power. Here, the stator coil 424 is integrally combined with a core base 425, and is electrically connected to the printed circuit board 45 via terminals 425*a* formed at the core base 425. A cylindrical container-like rotor 426 is fixedly mounted on an upper end portion of the rotation shaft 423 in surrounding relation to the stator coil 424. The rotor 426 comprises a resin-molded yoke 427 of a cylindrical container-shape, and an annular rotor magnet 428 which is mounted on an inner surface of the yoke 427, and has S-poles and N-poles alternately magnetized therein in a circumferential direction. Although the yoke 427 is molded of a phenolic resin, it can be molded of a PBT (polybutylene terephthalate) resin or a PPS (polyphenylene sulfide) resin.

Figure 7:
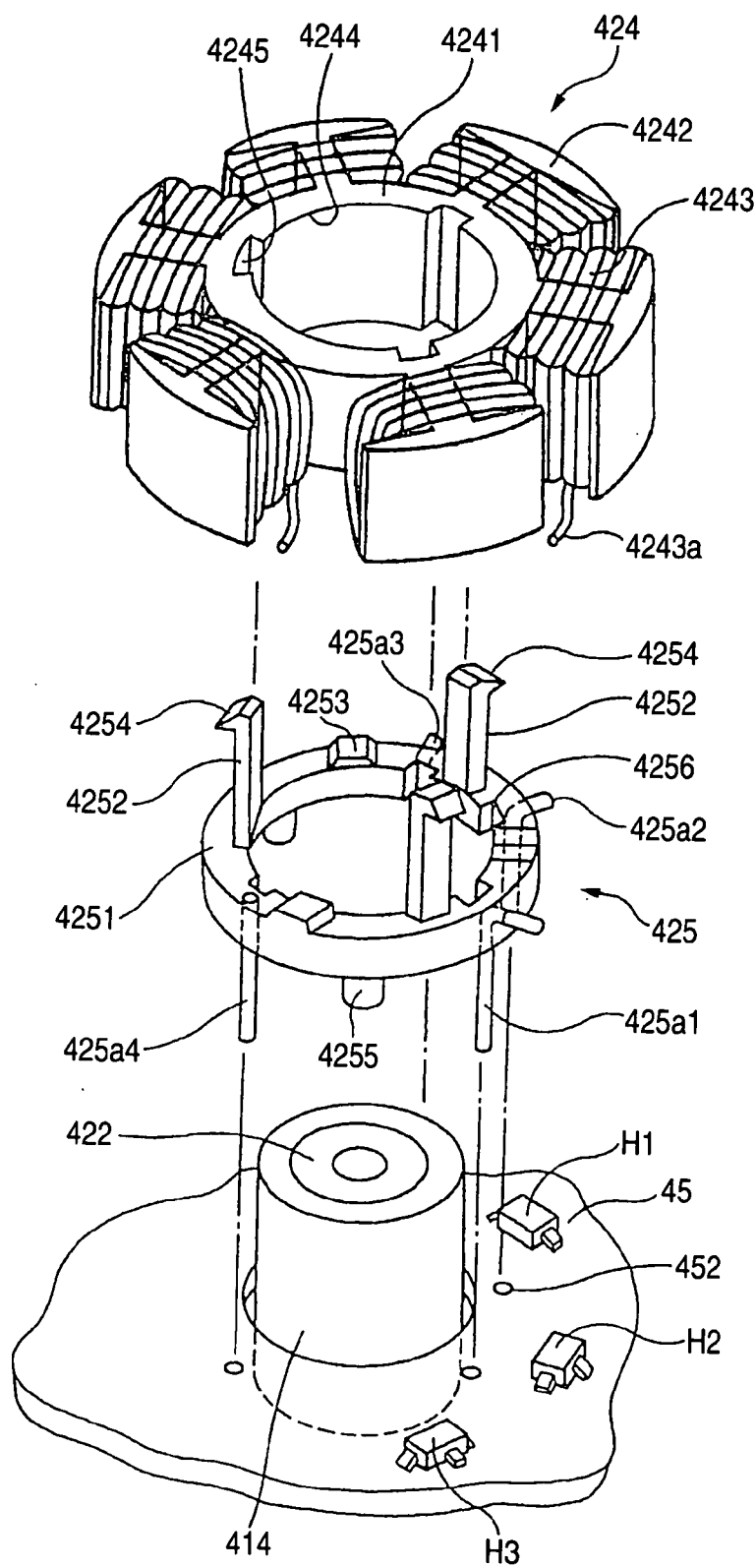
FIG. 7 is a partly-exploded, perspective view of a stator coil according to an exemplary, non-limiting embodiment of the present invention.
Figure 8:
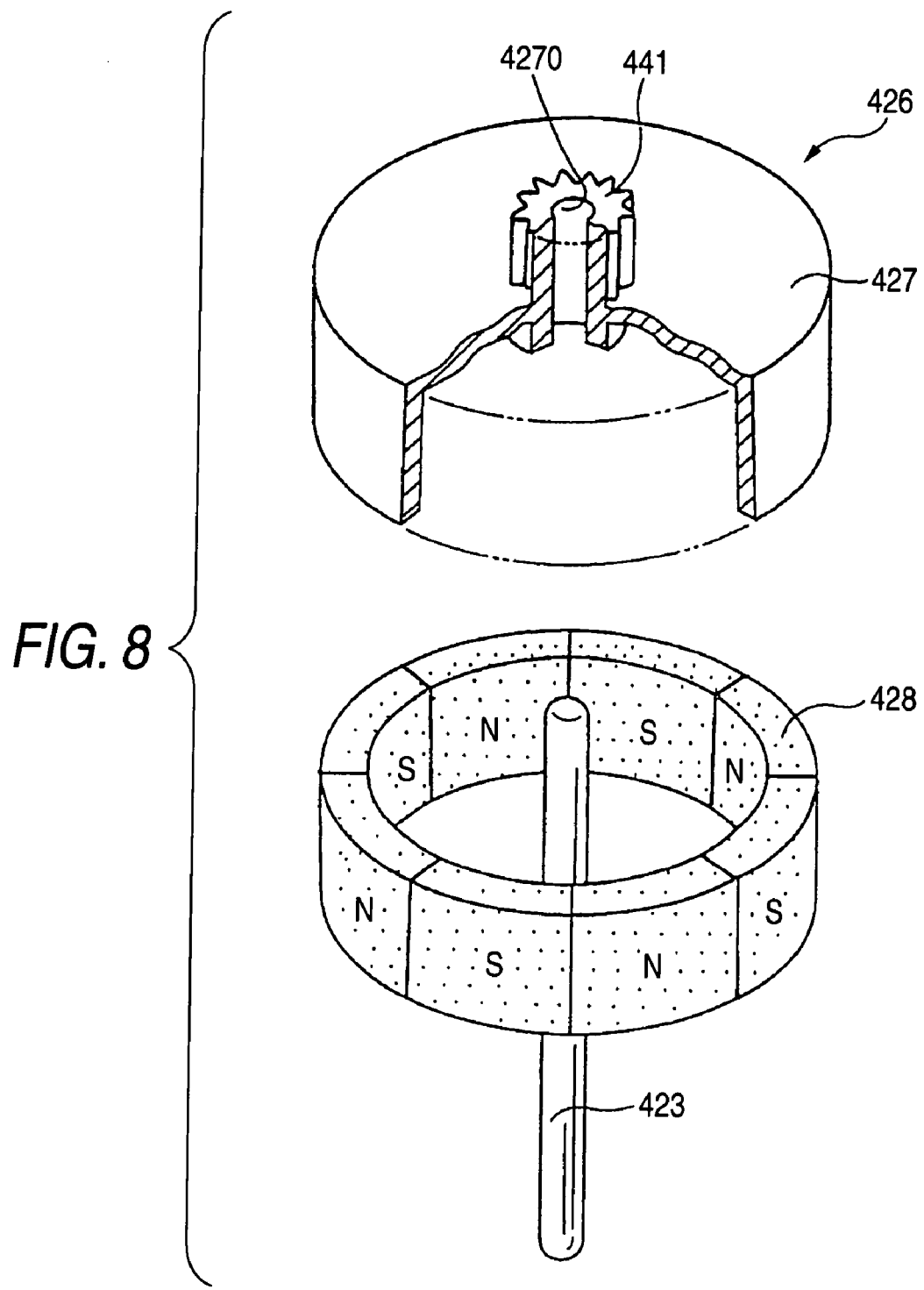
FIG. 8 is a partly-broken, exploded perspective view of a rotor according to an exemplary, non-limiting embodiment of the present invention.
Figure 9:
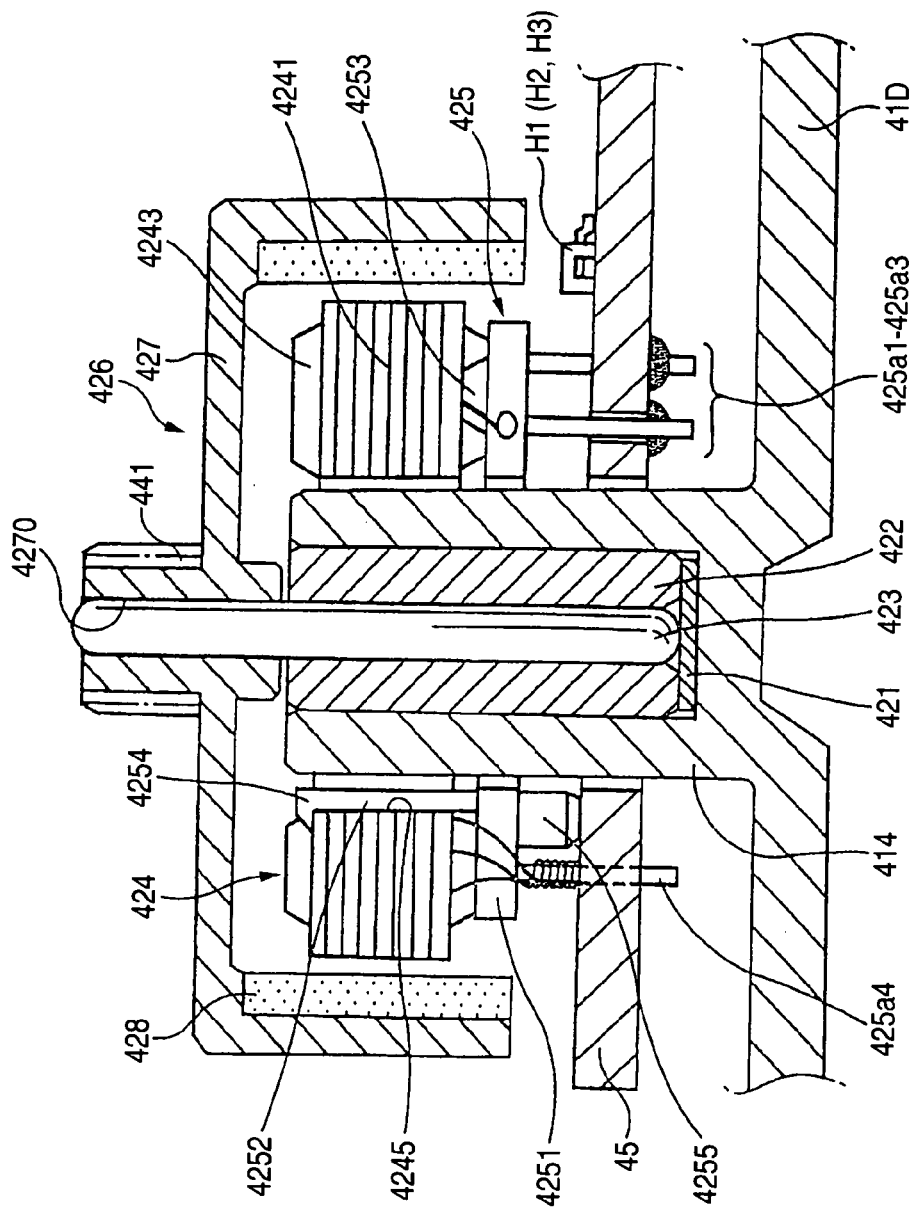
FIG. 9 is a cross-sectional view showing a portion of a brushless motor according to an exemplary, non-limiting embodiment of the present invention.

FIG. 7 is a partly-exploded, perspective view showing the stator coil 424 and the core base 425, and FIG. 8 is a partly-broken, partly-exploded perspective view of the rotor 426. FIG. 9 is a cross-sectional view of the brushless motor 42 incorporating the stator coil 424. The stator coil 424 includes a petal-shaped core 4241 having 6 radial arms 4242, and the coils 4243 are wound on the radial arms 4242, respectively. Each pair of diametrically-opposite coils 4243 are serially connected, so that the three pairs of coils are provided. Three fitting grooves 4245 are formed in an inner surface of a central hole 4244 in the core 4241, and are spaced from one another in a circumferential direction, and extend in an axial direction, each fitting groove 4245 being recessed toward the outer periphery of the core.

The core base 425 includes an annular portion 4251, and three narrow fitting support piece portions 4252 are formed integrally with and project axially from one surface of the annular portion 4251, and are circumferentially spaced from one another. Three short support seats 4253 are formed integrally with and project axially from the one surface of the annular portion 4251, the support seat 4253 being provided between any two adjacent fitting support piece portions 4252. A hook 4254 is formed at a distal end of each fitting support piece portion 4252. When the fitting support piece portions 4252 are passed through the central hole 4244 in the core 4241, they are fitted respectively in the fitting grooves 4245, respectively, and the hooks 4254 are engaged with one edge of the core 4241, so that the core 4241 is held between the hooks 4254 and the support seats 4253, thereby integrally combining the core base 425 and the stator coil 424 together. Two legs 4255 are formed integrally with and project axially respectively from two of six circumferentially-equally-divided sections of the other surface of the annular portion 4251 of the core base 425, and the terminals 425*a*, each comprising an electrically-conductive wire (metal wire) having a bent portion, extend respectively through the other four sections of the annular portion 4251, and are supported by this annular portion 4251, and distal end portions of the terminals 425*a* project from the annular portion 4251. Recesses 4256 are formed respectively in the inner peripheral surface of the core base, and are disposed respectively at those portions of the core base through which the terminals 425*a* extend, respectively.

Those portions of the annular portion 4251, in which the recesses 4256 are formed, respectively, are radially reduced in thickness. Three terminals 425*a*1 to 425*a*3 (disposed adjacent to one another in the circumferential direction) among the four terminals 425*a* are provided as separate terminals, respectively, and a terminal 4243*a* of one of each pair of coils 4243 is electrically connected by soldering to a proximal end of the corresponding terminal 425*a*1, 425*a*2, 425*a*3. The remaining terminal 425*a*4 serves as a common terminal, and a terminal 4243*a* of the other of each pair of coils 4243 is electrically connected to a proximal end of this common terminal by soldering.

When the fitting support piece portions 4252 of the core base 425 (which is separate from the stator coil 424) are passed respectively through the fitting grooves 4245 in the core 4241, the hooks 4254 of the fitting support piece portions 4252 are engaged with the one edge of the core 4241, so that the core 4241 is held between the support seats 4253 on the core base 425 and the hooks 4254, thereby integrally combining the core base and the core together. At this time, the support seats 4253 are held against the other end or edge of the core 4241, thereby positioning the core 4241 relative to the core base 425.

The terminals 4243*a* of the three pairs of coils 4243 are electrically connected to the three separate terminals 425*a*1 to 425*a*3 and one common terminal 425*a*4, and then the distal end portions of the terminals 425*a*1 to 425*a*4 are passed respectively through holes 452 in the printed circuit board 45, until the two legs 4255 are brought into contact with the surface of the printed circuit board 45. Then, the distal end portions of these terminals are soldered to circuit electrodes on the reverse surface of the printed circuit board 45. By doing so, the core base 425 is mounted on the printed circuit board 45, and the electrical connection to the coils 4243 is effected.

As a result, the core base 425 is fixedly supported on the printed circuit board 45 such that the core base 425 is positioned relative to the printed circuit board 45 through the legs 4255. Also, the stator coil 424 is stably supported such that the stator coil 424 is positioned relative to the printed circuit board 45. In this condition, the stator coil can be supplied with electric power via the printed circuit board 45.

In this exemplary, non-limiting embodiment, the distal end portions of the three separate terminals 425*a*1 to 425*a*3 are soldered to the printed circuit board 45, but the solders on the distal end portions of these terminals will not be melted since the terminals of the coils are soldered to the proximal ends of these terminals 425*a*1 to 425*a*3. The single common terminal 425*a*4 to which the terminals of the coils are electrically connected does not need to be connected to an external portion, and therefore is not soldered to the printed circuit board 45.

Therefore, a related art solder-melting problem is not encountered, even when the terminals of the three coils are soldered to the distal end portion of the common terminal 425*a*4. Also, even when stress is transmitted from the printed circuit board 45 to the terminals 425*a*1 to 425*a*4 after soldering, the stress will not adversely affect the stator coil 424 through the annular portion 4251 since those portions of the annular portion 425 through which the terminals pass, respectively, are reduced in thickness by the recesses 4256.

On the other hand, the rotor 426, fixedly mounted on the upper end portion of the rotation shaft 423, is disposed to cover the outer periphery and upper side of the stator coil 424 as shown in FIGS. 4 and 8. As described above, the rotor 426 includes the resin-molded yoke 427 of a cylindrical container-shape. The annular rotor magnet 428 mounted on the inner surface of the yoke 427 has the S-poles and N-poles alternately magnetized therein in the circumferential direction. A first gear 441 of the gear mechanism 44 (described later) is formed integrally with and projects from a central portion of a circular outer surface of the yoke 427, and the rotation shaft 423 is fitted in a shaft hole 4270, formed through the first gear 441, and is integrally combined therewith.

In the brushless motor 42 of this construction, by supplying AC powers U, V and W, different in phase, to the three coils of the stator coil 424, the direction of a magnetic force between the stator coil and the rotor magnet 428 is changed, thereby driving or rotating the rotor 426 and the rotation shaft 423.

Figure 19:
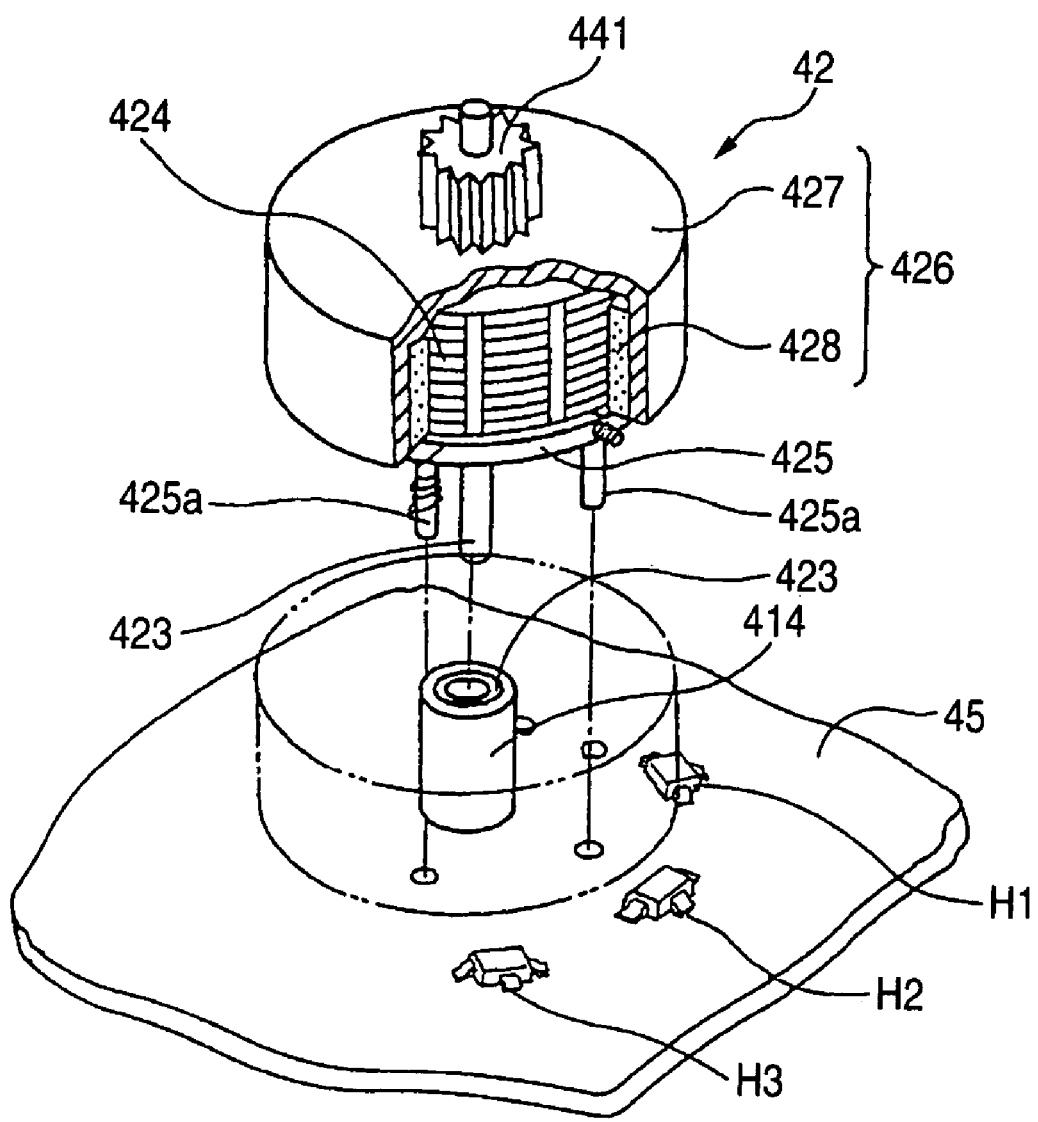
FIG. 19 is an exploded, perspective view of the brushless motor.

As shown in FIGS. 7 and 19, a plurality of (three in this embodiment, but not limited thereto) Hall elements or Hall ICs (hereinafter referred to as "Hall ICs") H1, H2 and H3 are mounted on the printed circuit board 45, and are arranged at predetermined intervals in the direction of the circumference of the rotor 426. When the rotor magnet 428 rotates together with the rotor 426, a magnetic field at each of the Hall ICs H1, H2 and H3 is changed, and each Hall IC H1, H2, H3 is changed between an ON-state and an OFF-state, and outputs a pulse signal corresponding to a rotation period of the rotor 426.

In FIGS. 4 to 6, the first gear 441, resin-molded integrally with the yoke 427 of the rotor 426, forms part of the gear mechanism 44, and is designed to drive and rotate the rotation output shaft 448 in a speed-reducing manner. Namely, the gear mechanism 44 includes the first gear 441, a second gear 443 rotatably mounted on a first fixed shaft 442 supported in the second hollow boss 415, a third gear 445 rotatably mounted on a second fixed shaft 444 supported in the third hollow boss 416, and a sector gear 447 which is rotatably supported on a third fixed shaft 446 supported in the fourth hollow boss 417, and is formed integrally with the rotation output shaft 448. Each of these gears is made of a molded resin.

As shown in FIGS. 5 and 6, the second gear 443 includes a second larger-diameter gear 443a and a second smaller-diameter gear 443b which are integrally formed with each other, and are arranged in an axial direction, the second larger-diameter gear 443a being in mesh with the first gear 441. The third gear 445 includes a third larger-diameter gear 445a and a third smaller-diameter gear 445b which are integrally formed with each other, and are arranged in an axial direction, the third larger-diameter gear 445a being in mesh with the second smaller-diameter gear 443b. The third smaller-diameter gear 445b is in mesh with the sector gear 447. The axial positions of these meshed gears are determined such that the meshing of these gears is made sequentially in the axial direction of each shaft from the first gear 411 of the first stage toward the sector gear 447 of the final stage, that is, in the downward direction when the lower half portion 41D is defined as a reference. Therefore, when these gears are mounted within the casing 41, with the respective shafts passed therethrough, the gears need only be sequentially incorporated into the casing, so that the operation for assembling the actuator can be carried out easily.

With this construction of the gear mechanism 44, a rotational force of the first gear 441, rotating together with the rotor 426 of the brushless motor 42, is reduced through the second gear 443, the third gear 445 and the sector gear 447, and is transmitted to the rotation output shaft 448. Stoppers 491 are formed on and project from the inner surface of the lower half portion 41D, and are disposed respectively at opposite ends of a path of rotation of the sector gear 447. Opposite ends of the sector gear 447 can be brought into abutting engagement with the stoppers 491, respectively. These stoppers 491 limit the range of angular movement of the sector gear 447, and hence the range of angular movement of the rotation output shaft 448.

The first, second and third gears 441, 443 and 445 and the sector gear 447 are made of a resin, and are substantially made of the following materials.

(a) First gear 441 (integral with the yoke 427): Phenolic resin
(b) Second gear 443: Polyacetal containing sliding agent
(c) Third gear 445: Standard polyacetal
(d) Sector gear 447 (integral with the rotation output shaft 448): Nylon The first gear 441 is made of a phenolic resin (thermo-setting resin) which can be highly precisely molded into a predetermined shape. By doing so, the first gear 441., having the smallest diameter, can be formed with high dimensional accuracy, and the rotational drive force, produced by the brushless motor 42, can be transmitted to the gear mechanism at a high gear ratio, that is, at a high reduction ratio. The second gear 443 is made of polyacetal containing the sliding agent having self-lubricating properties, and by doing so, the lubricity in the meshing engagement of this second gear with the first and third gears 441 and 445 is enhanced. The sector gear 447, which is integral with the rotation output shaft 448 for directly angularly moving the projector lamp 30, is made of nylon having high heat resistance, and by doing so, the smoothness in the meshing engagement of this sector gear with the third gear 445 is enhanced. Besides thermal deformation due to heat, developing during the angular movement, is prevented, so that the rotation drive force can be properly transmitted to the projector lamp 30. Therefore, it is not necessary to use grease in the meshed gears of the gear mechanism 44, and the fogging of the lamp lens and others by grease can be prevented.

The above resin materials for the first to third gears and sector gear are merely examplary, but are not intended to be limiting, and a self-lubricating resin, a heat-resistant resin, a resin capable of achieving high dimensional accuracy can be suitably used in combination, and by doing so, similarly, there can be provided the gear mechanism which has high lubricating properties and a high reliability of the operation.

Figure 10:
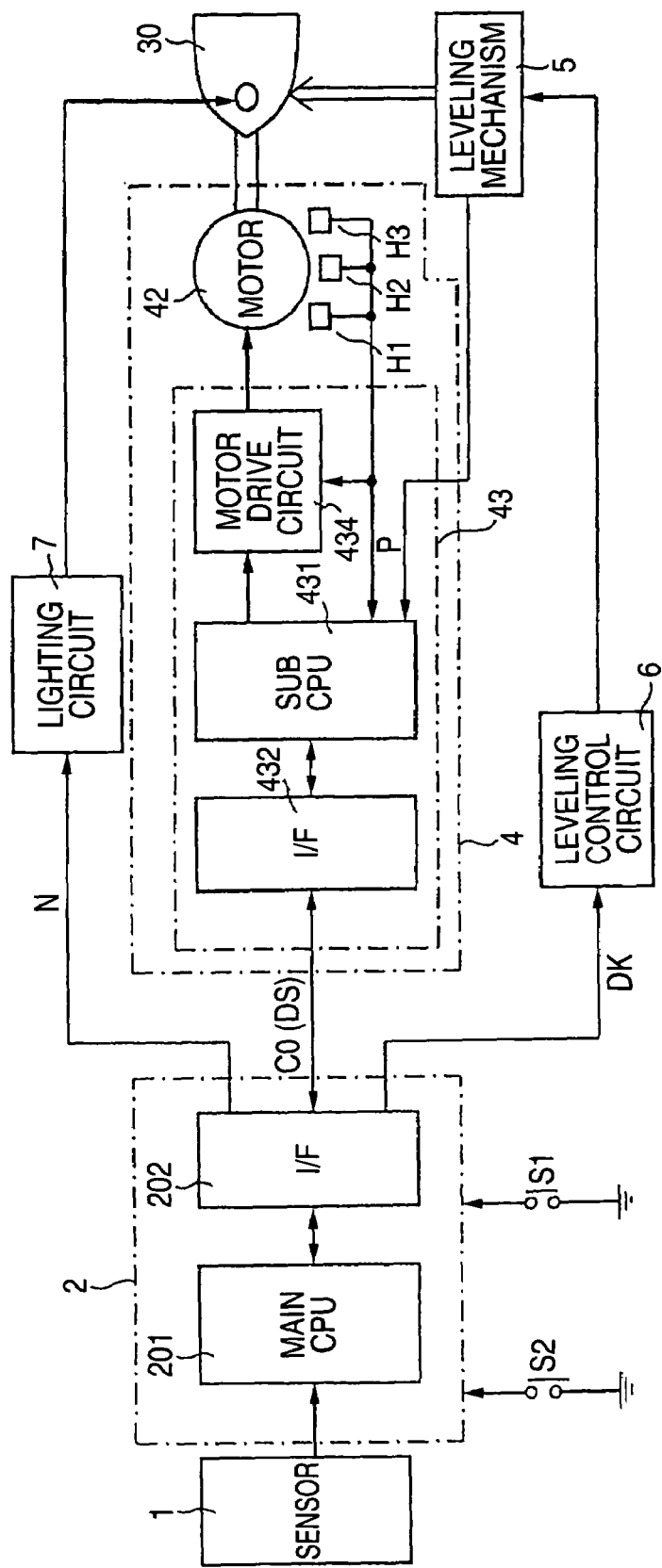
FIG. 10 is a block circuit diagram showing a circuit construction of the AFS according to an exemplary, non-limiting embodiment of the present invention.

FIG. 10 is a block diagram of the electric circuit of the lighting unit including the ECU 2 and the actuator 4. The actuator 4 is provided in each of the right and left swivel lamps 3R and 3L of the car, and a two-way communication can be effected between the actuator 4 and the ECU2. The ECU 2 includes a main central processing unit (CPU) 201 for processing based on information from the sensors 1 according to an algorithm, to output a required control signal C0, and an interface (hereinafter referred to as "I/F") circuit 202 for inputting and outputting the control signal C0 between the main CPU 201 and the actuator 4.

An ON/OFF signal from a lighting switch S1, provided at the car, can be inputted into the ECU 2, and in accordance with the ON/OFF state of the lighting switch S1, the ECU 2 controls the lighting circuit 7 (connected to an on-vehicle power source (not shown) to supply electric power to the discharge bulb 304 of the projector lamp 30) by a control signal N so as to turn on and off the swivel lamp 3R, 3L. The ECU 2 controls a leveling control circuit 6 (for controlling the leveling mechanism 5 for adjusting the optical axis of the bracket (supporting the projector lamp 30) in the upward-downward direction) by a leveling signal DK to adjust the optical axis of the projector lamp 30 in accordance with a change of the car height. The coupling of these electric circuits to the power source is turned on and off by an ignition switch S2 for turning on and off an electric system provided at the car.

The control circuit 43, provided on the printed circuit board 45 contained in the actuator 4 mounted in each of the right and left swivel lamps 3R and 3L of the car, includes an I/F circuit 432 for inputting and outputting a signal between the control circuit 43 and the ECU 2, a sub-CPU 431 for effecting a processing on the basis of a signal from the I/F circuit 432 and pulse signals from the Hall ICs H1, H2 and H3 according to a predetermined algorithm, and a motor drive circuit (rotation drive means) 434 for driving and rotating the brushless motor 42. The ECU 2 outputs a right-left deflection angle signal DS (which is part of the control signal CO) representative of a right-left deflection angle of the swivel lamp 3R, 3L, and this signal is inputted to the actuator 4.

Figure 11:
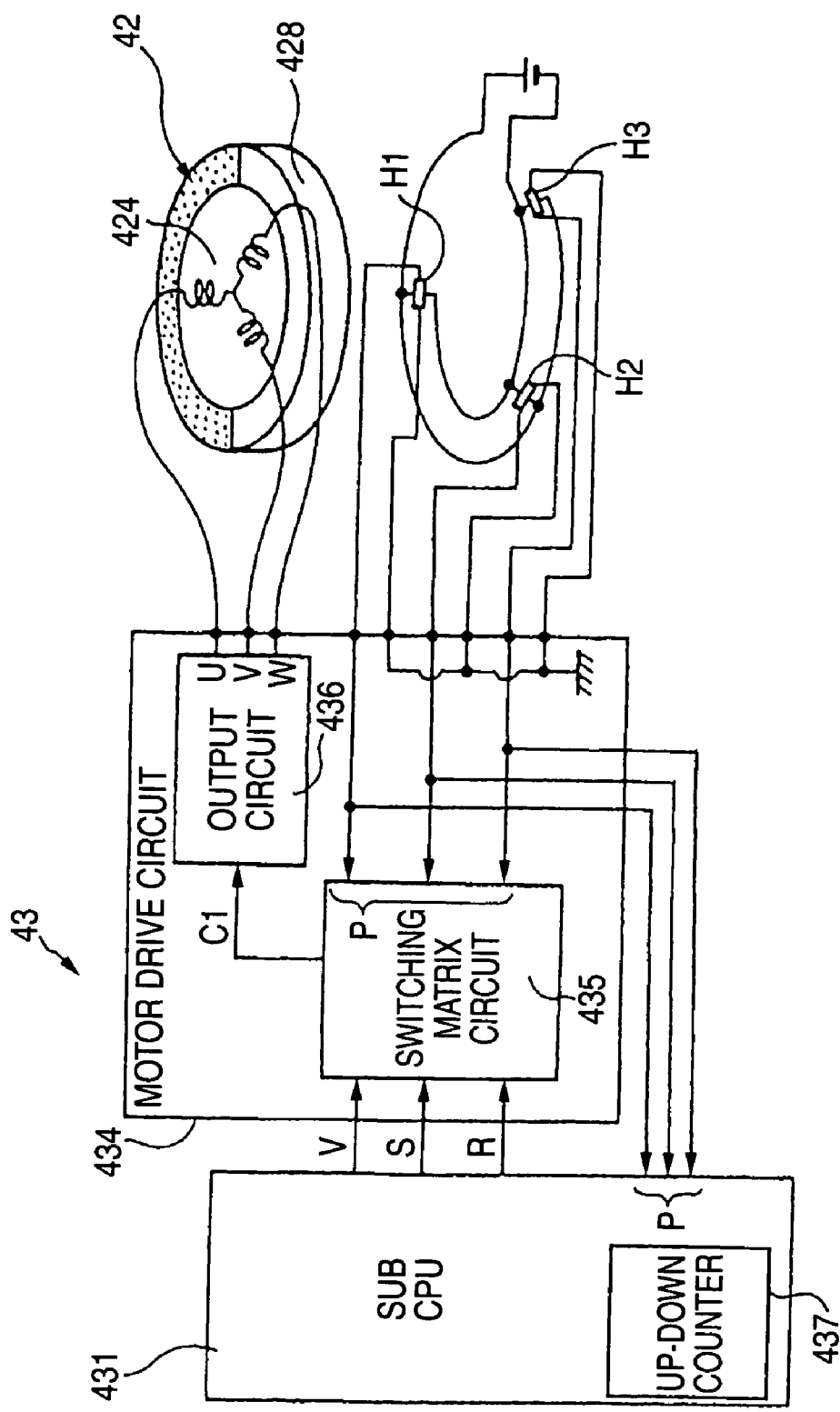
FIG. 11 is a circuit diagram showing a circuit construction of the actuator according to an exemplary, non-limiting embodiment of the present invention.

FIG. 11 is a circuit diagram schematically showing the motor drive circuit 434 of the control circuit 43 and the brushless motor 42 in the actuator 4. The motor drive circuit 434 includes a switching matrix circuit 435 and an output circuit 436. The control signals include a speed control signal V, a start/stop signal S and a normal/reverse rotation signal R from the sub-CPU 431 of the control circuit 43, as well as pulse signals from the three Hall ICs H1, H2 and H3, all of which are inputted into the switching matrix circuit 435. The output circuit 436 is responsive to an output of the switching matrix circuit 435 to adjust the phases of three-phase (U-phase, V-phase and W-phase) electric powers supplied respectively to the three pairs of coils of the stator coil 424 of the brushless motor 42. In this motor drive circuit 434, the U-phase, V-phase and W-phase powers are supplied to the stator coil 424, thereby rotating the rotor magnet 428. Therefore the yoke 427 (integral with this rotor magnet), that is, the rotor 426 and the rotation shaft 423, rotate. When the magnet rotor 428 rotates, the Hall ICs H1, H2 and H3 detect a change of the magnetic field to output pulse signals P, respectively, and these pulse signals P are input into the switching matrix circuit 435. In this switching matrix circuit 435, a switching operation for the output circuit 436 is effected in accordance with the timings of the pulse signals, so that the rotor 426 continues to rotate.

In accordance with the speed control signal V, the start/stop signal S and the normal/reverse rotation signal R from the sub-CPU 431, the switching matrix circuit 435 feeds a required control signal C1 to the output circuit 436. In response to this control signal C1, the output circuit 436 adjusts the phases of the three-phase powers (which are to be supplied to the stator coil 424), and controls the start and stop of the rotation of the brushless motor 42, the direction of rotation thereof and the speed of rotation thereof. Part of each of the pulse signals P, outputted respectively from the Hall ICs H1, H2 and H3, is inputted into the sub-CPU 431, so that this sub-CPU recognizes the rotating condition of the brushless motor 42. An up-down counter 437 is contained in the sub-CUP 431, and the pulse signals from the Hall ICs H1, H2 and H3 are counted, so that the value of this count corresponds to the rotational position of the brushless motor 42.

Figure 1:
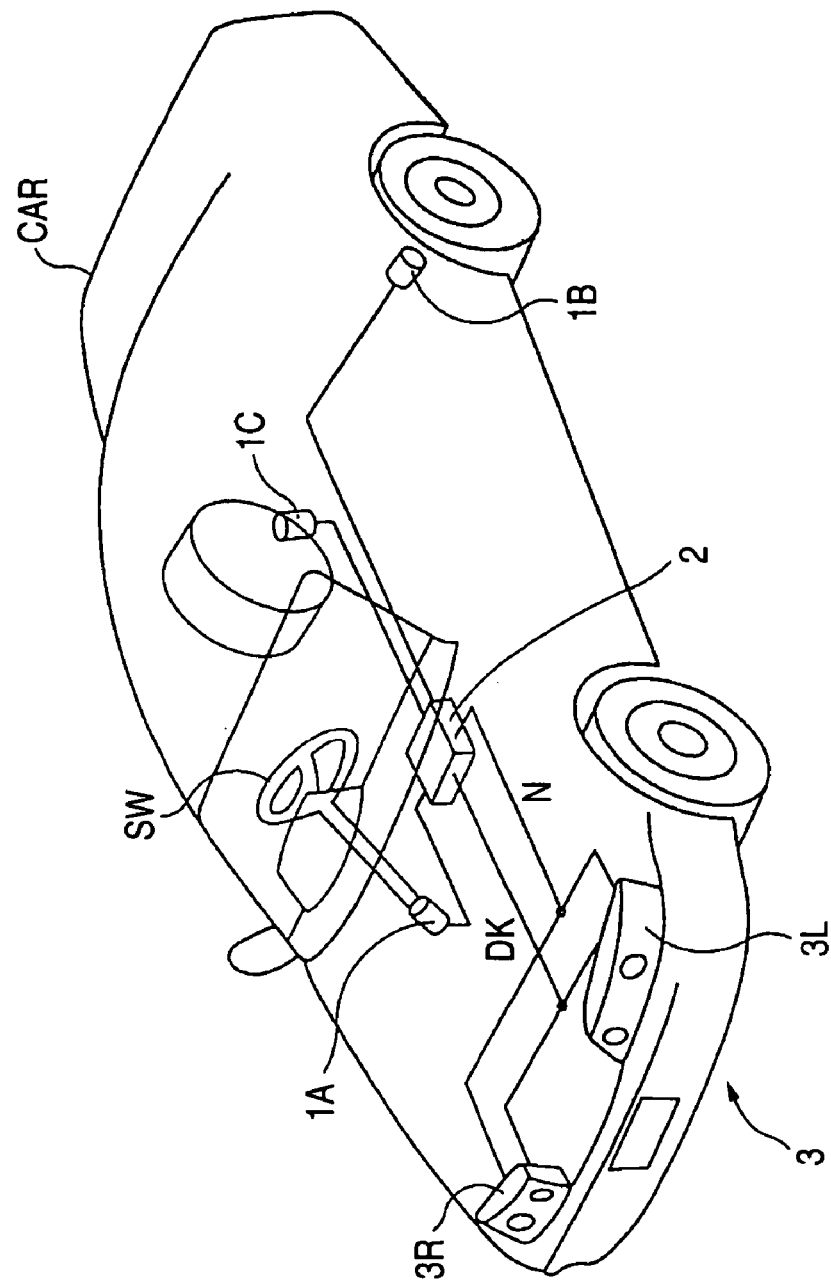
FIG. 1 is a view showing a conceptual construction of a related art AFS.

In the above construction, when the ignition switch S2 is turned on, and also the lighting switch S1 is turned on, information, representing the steering angle of the steering wheel SW, the speed of the car, the car height of the car, etc., is inputted into the ECU 2 from the sensors 1 mounted on the car as shown in FIG. 1. In the ECU 2, the main CPU 201 effects a computing operation on the basis of the sensor outputs inputted thereto, and computes the right-left deflection angle signal DS of the projector lamp 30 of each of the swivel lamps 3R and 3L of the car, and these signals DS are inputted respectively to the actuators 4 of the two swivel lamps 3R and 3L.

In the actuator 4, the sub-CPU 431 effects a computing operation on the basis of the right-left deflection angle signal DS inputted thereto, and computes a signal corresponding to this right-left deflection angle signal DS, and this computed signal is fed to the motor drive circuit 434, thereby driving and rotating the brushless motor 42. A rotation drive force of the brushless motor 42 is reduced in speed by the reduction gear mechanism 44, and is transmitted to the rotation output shaft 448. Therefore, the projector lamp 30, connected to the rotation output shaft 448, is angularly moved in the horizontal direction, so that the optical axis of the swivel lamp 3R, 3L is deflected right and left.

When the projector lamp 30 is thus angularly moved, the angle of deflection of the projector lamp 30 is detected by the angle of rotation of the brushless motor 42. Namely, the sub-CPU 431 detects this deflection angle on the basis of the pulse signals P (P1, P2 and P3) outputted from the three Hall ICs H1, H2 and H3 provided at the brushless motor 42 as shown in FIG. 10. Further, the sub-CPU 431 compares the right-left deflection angle signal DS, inputted thereto from the ECU2, with a detection signal representative of the detected deflection angle, and effects a feedback control of the rotation angle of the brushless motor 42, so that the two can coincide with each other. By doing so, the optical axis of the projector lamp 30, that is, the optical axis of the swivel lamp 3R, 3L, is highly precisely brought into a deflection position set by the right-left detection angle signal DS.

In this deflecting operation for the projector lamp 30, deflected light, emitted from the swivel lamp 3R, 3L, illuminates a zone deflected right or left from a direction of straight travel of the car. therefore, during travel of the car, each lamp can illuminate a zone ahead of the car, not only in the direction of straight travel of the car but also in a direction toward which the car is steered. As a result, driving safety is enhanced.

As described above, in the brushless motor 42 serving as the drive source for effecting the deflecting operation of each swivel lamp 3R, 3L, the resin-molded yoke 427 of the rotor 426 has a cylindrical container-like shape, and the annular rotor magnet 428 is mounted on the inner peripheral surface of this yoke, and the first gear 441 of the gear mechanism 44 is formed integrally with and projects from the central portion of the circular outer surface of the yoke 427, and the rotation shaft 423 is fitted in the shaft hole 4270, thereby providing the unitary construction.

Figure 20:
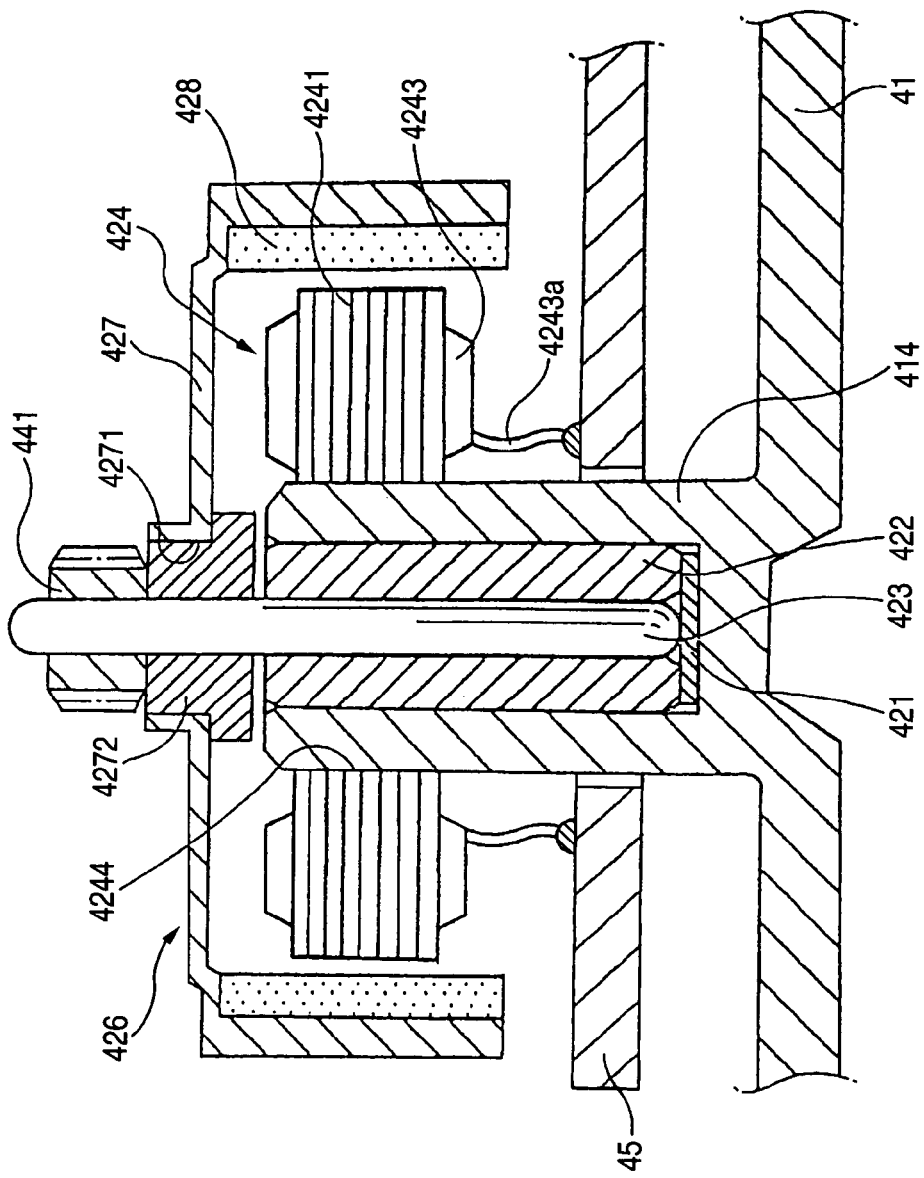
FIG. 20 is a cross-sectional view of a portion of a brushless motor according to a related art.
Figure 21:
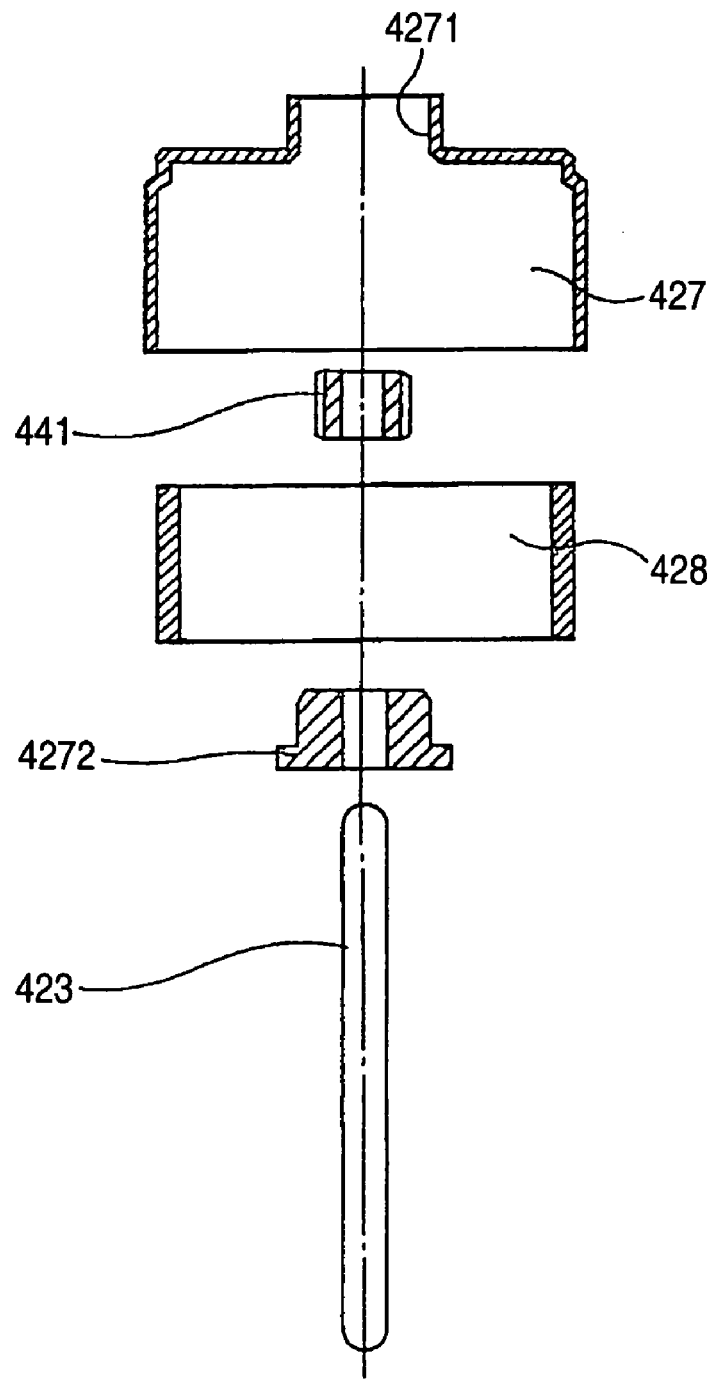
FIG. 21 is an exploded, perspective view of a rotor of the brushless motor according to the related art.

As compared with the related art brushless motor of FIG. 20 in which the yoke 427, the bushing 4272 and the gear 441 are provided as separate parts, respectively, such parts can be provided by one resin-molded part in the present invention. In the assembling of the rotor 426, the step of mounting the rotor magnet 428 on the inner peripheral surface of the yoke 427 is the same as in the related art. However, thereafter, it is only necessary to fit the rotation shaft 423 in the shaft hole in the yoke 427, and the related art press-fitting operations, heretofore required for assembling the related art bushing 4272, the yoke 427 and the gear 423 together, are not necessary in the present invention.

The fitting portions of the rotation shaft 423 and the shaft hole portion 4270 of the yoke 427 have the spline structure, and with this construction the operation for fitting the rotation shaft 423 into the yoke 427 can be effected more easily. Also, by insert-molding the rotation shaft 423 directly in the yoke 427, this fitting operation can be omitted. Therefore, the overall cost, including the cost of the parts and the cost of the brushless motor-assembling operation, is reduced, thereby achieving the low cost-design of the brushless motor.

In addition, press-fitting margins for the purpose of press-fitting the relevant parts do not need to be provided on the rotation shaft 423, and therefore the axial dimension of the rotation shaft can be reduced, which is advantageous in achieving the compact design. Furthermore, the yoke 427 and the first gear 441 are made of the resin, and therefore the lightweight design can be achieved, and this prevents the vibration during the high-speed rotation. Furthermore, the yoke 427 can be supported on the rotation shaft 423 merely by press-fitting this single yoke 427 on the rotation shaft 423, and therefore the assembling precision can be enhanced, and the rotation balance of the rotor can be improved, thereby enhancing the rotation characteristics.

Even though the yoke 427 is made of the resin, the rotation characteristics, not inferior to those of the brushless motor with the metallic yoke according to the related art, can be obtained by the use of the rotor magnet 428 having a high magnetic field intensity.

In the brushless motor 42, before the stator coil 424 is mounted on the printed circuit board 45, the core base 425 is beforehand integrally combined with the core 4241, and the terminals of the coils 4243 are soldered to the terminals 425a1 to 425a4, and then the terminals 425a1 to 425a4 of the core base 425 are passed respectively through the holes 452 in the printed circuit board 45, and these terminals are soldered to the reverse surface of the printed circuit board 45, thereby mounting the stator coil on the printed circuit board. Therefore, the mounting and soldering of the stator coil 424 relative to the printed circuit board 45 can be effected easily, and besides the stator coil 424 can be highly precisely positioned relative to the printed circuit board 45 by the core base 425.

Therefore, when the printed circuit board 45 is mounted in the predetermined position within the housing 41 such that the printed circuit board is fixedly held between the upper and lower half portions 41U and 41D, the stator coil 424 can be mounted on the first hollow boss 414 in highly-precisely positioned relation thereto.

<Second Embodiment>

Figure 12:
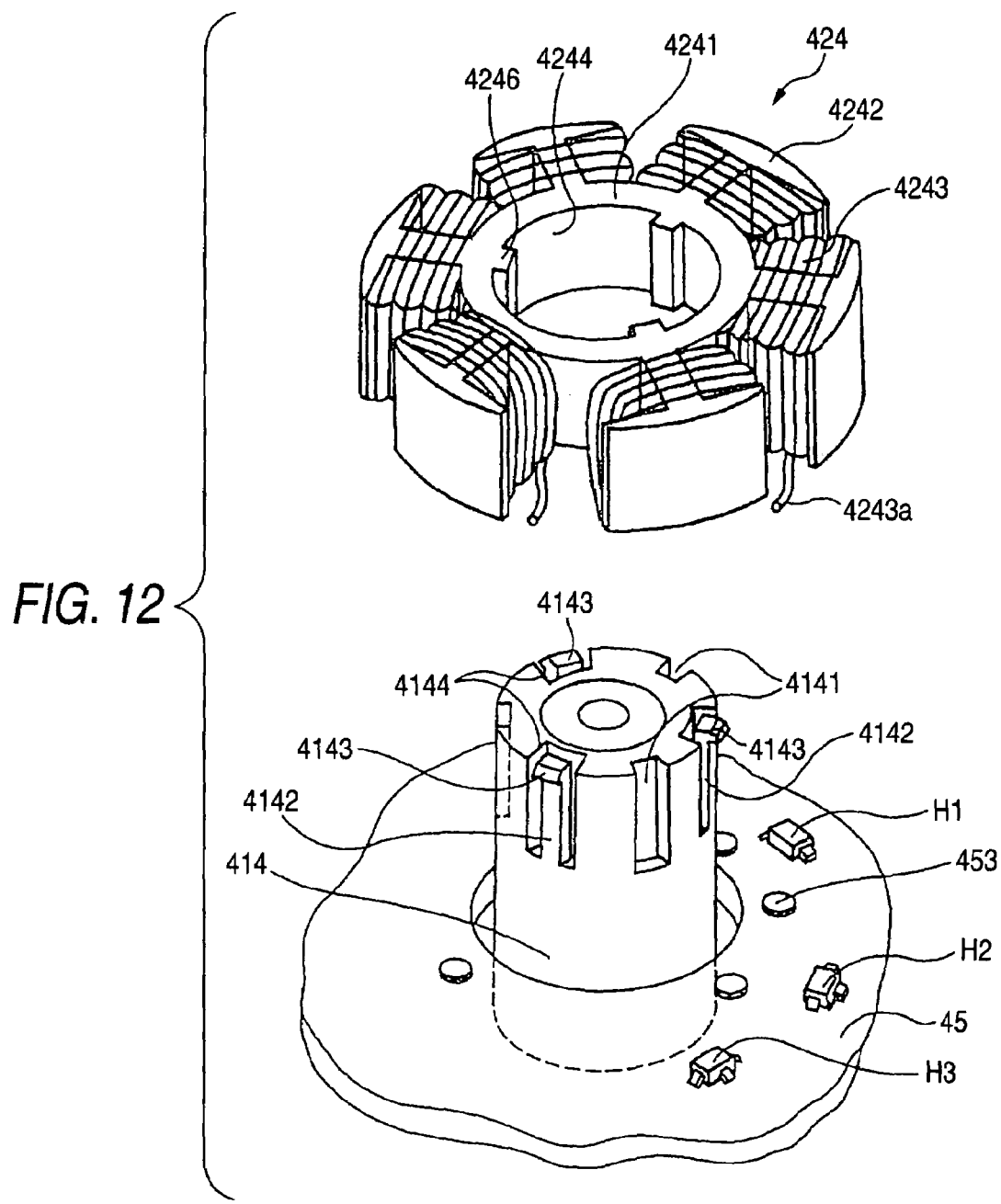
FIG. 12 is a partly-exploded, perspective view of a stator coil of a second exemplary, non-limiting embodiment of the present invention.
Figure 13:
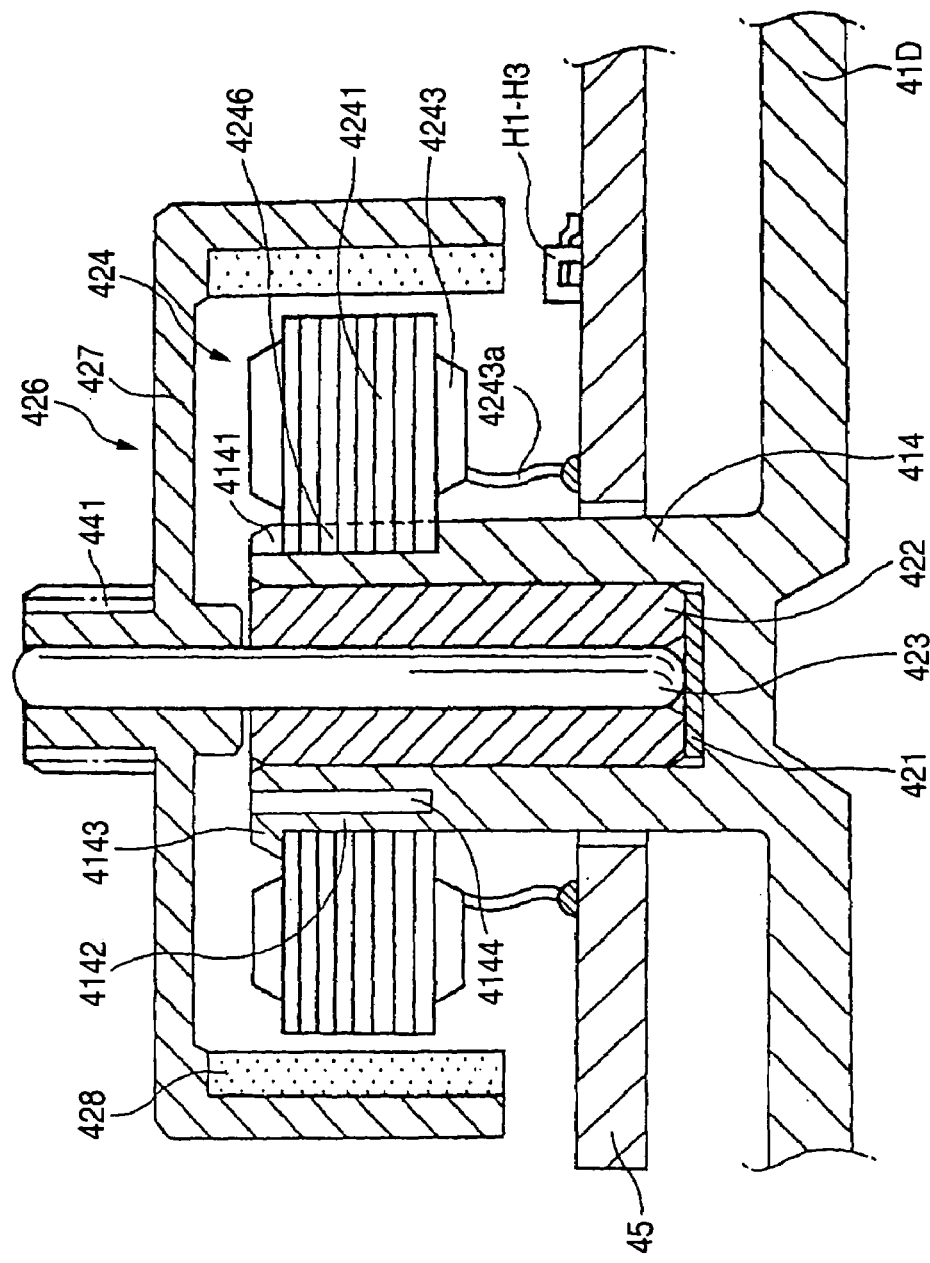
FIG. 13 is a cross-sectional view of a brusless motor of the second exemplary, non-limiting embodiment of the present invention.

FIG. 12 is a partly-exploded, perspective view showing a support structure of a stator coil 424 of a second exemplary, non-limiting embodiment of the present invention, and FIG. 13 is a cross-sectional view of a brushless motor employing this stator coil 424, showing its assembled condition. Although the stator coil 424 is directly fitted and supported on a first hollow boss 414 of a housing 41 as in the related art, the precision of positioning of the stator coil relative to the first hollow boss 414, as well as the stability of supporting of the stator coil on the first hollow boss 414, is enhanced.

Three radially inwardly-projecting keys 4246 are formed on an inner surface of a central hole 4244 in a core 4241 of the stator coil 424, and are spaced from one another in a circumferential direction, and extend in an axial direction. On the other hand, three key grooves 4141, corresponding respectively to the keys 4246, are formed in an outer peripheral surface of the first hollow boss 414 of the housing 41 at a distal end portion thereof, and are spaced from one another in a circumferential direction, and extend a predetermined distance from the distal end of this boss 414 in an axial direction.

Also, three tongue-like retaining piece portions 4142 (each of which can be elastically deformed in a radial direction, and has a hook 4143 formed at its distal end) are formed on the outer peripheral surface of the first hollow boss 414, the retaining piece portion 4142 being disposed between any two adjacent key grooves 4141 spaced from each other in the circumferential direction. Here, the retaining piece portions 4142 are disposed respectively in grooves 4144, formed in the outer peripheral surface of the first hollow boss 414, to be elastically deformed radially of this hollow boss 414.

In this construction, terminals 4243a of coils 4243 are soldered to electrodes 453 on a printed circuit board 45, so that the stator coil 424 is supported above the printed circuit board 45 in a floating condition thanks to the rigidity of these terminals as in the construction of the related art. Then, the printed circuit board 45 is mounted in a lower half portion 41D of the housing 41, and at this time the stator coil 424 is fitted on the first hollow boss 414 such that the keys 4246 of the stator coil 424 are fitted respectively in the key grooves 4141 in the first hollow boss 414. As a result, the core 4214 of the stator coil 424 abuts at its lower edge against lower end surfaces of the key grooves 4141, and at the same time the hooks 4143 of the retaining piece portions 4142 are engaged with the upper edge portion of the central hole in the core 4241. Therefore, the positioning of the stator coil 424 in the circumferential direction is effected by the keys 4246 and the key grooves 4141, and also the stator coil is prevented by the hooks 4143 of the retaining piece portions 4142 from being disengaged from the first hollow boss 414. Therefore, in this second embodiment, some time and labor are required for mounting the stator coil 424 on the printed circuit board 45, but when the stator coil 424 is thereafter mounted within the housing, the stator coil 424 is highly precisely located relative to the first hollow boss 414, and also is stably and highly precisely located relative to a rotor 426 mounted on the first hollow boss 414.

<Third Embodiment>

Figure 14:
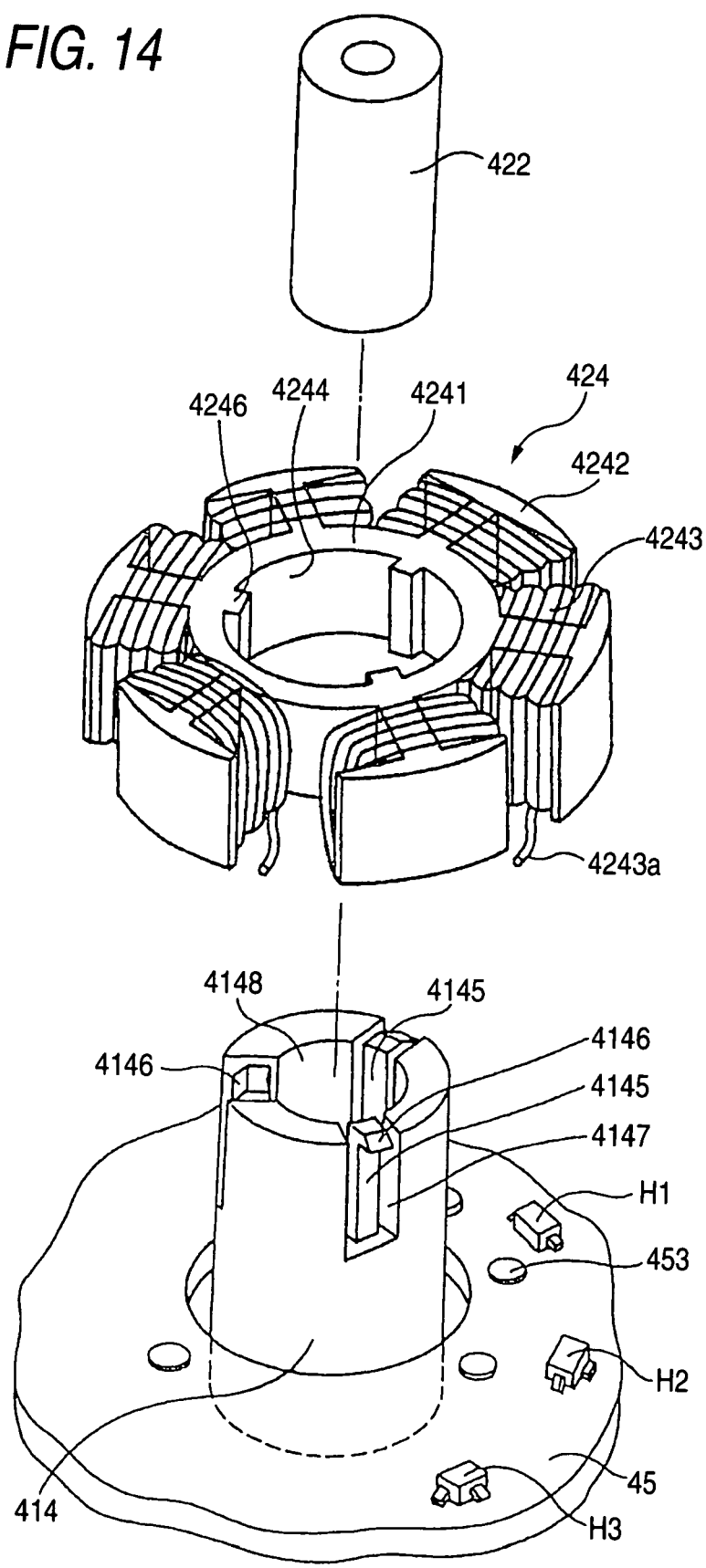
FIG. 14 is a partly-exploded, perspective view of a stator coil of a third exemplary, non-limiting embodiment of the present invention.
Figure 15:
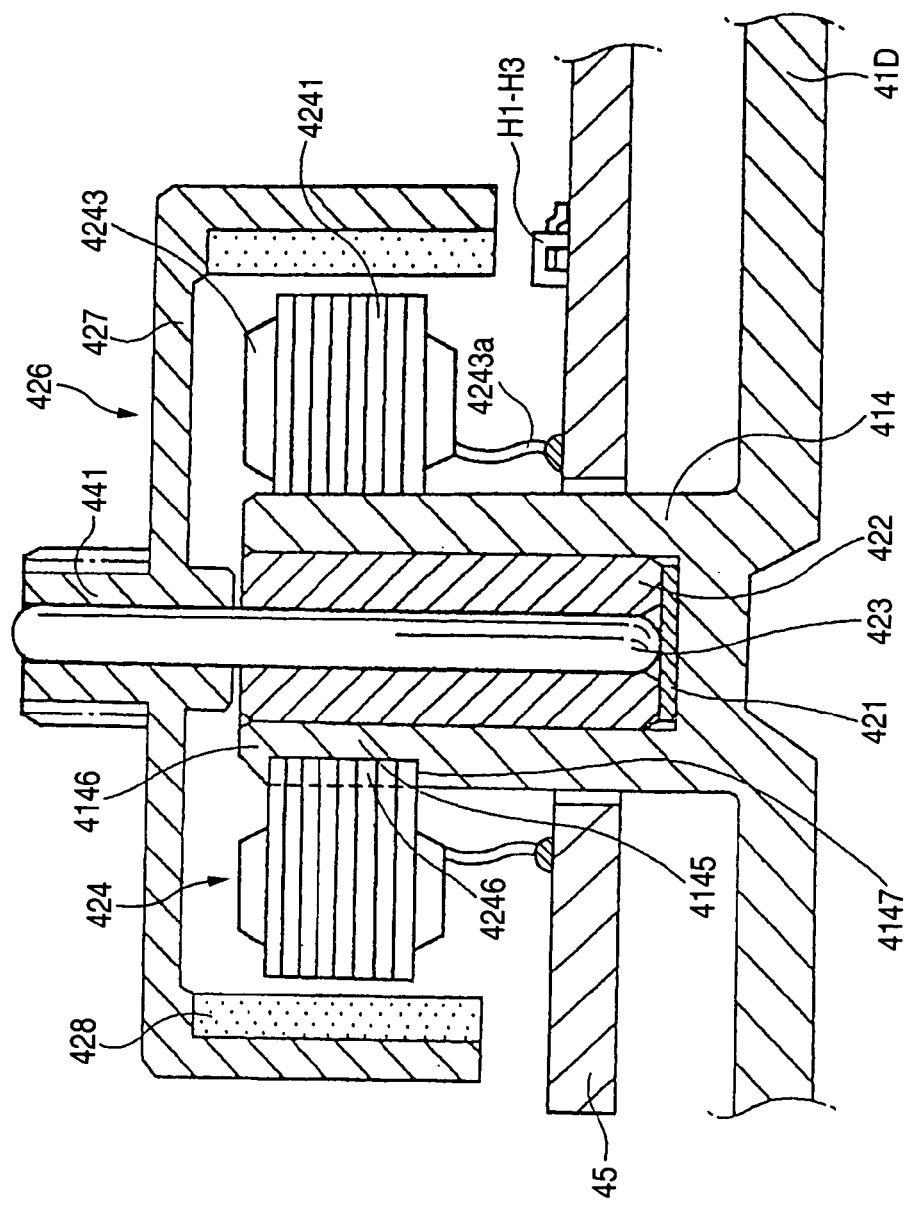
FIG. 15 is a cross-sectional view of a brushless motor of the third exemplary, non-limiting embodiment of the present invention.

FIG. 14 is a partly-exploded, perspective view showing a third embodiment of a stator coil 424 of the invention which is a modification of the second exemplary, non-limiting embodiment, and FIG. 15 is a cross-sectional view of a brushless motor employing this stator coil 424, showing its assembled condition. This embodiment is identical to the second embodiment in that keys 4246 are formed on an inner surface of a central hole 4244 in a core 4241 of the stator coil 424. On the other hand, this embodiment differs from the second embodiment in that engagement piece portions 4145, each having a hook 4146 formed at its distal end, are provided respectively at circumferentially-spaced portions of a first hollow boss 414 corresponding respectively to the keys 4246.

More specifically, slots 4147 of a predetermined length are formed respectively through those circumferentially-spaced portions of a peripheral wall of the first hollow boss 414 corresponding respectively to the keys 4246, and extend from a distal end of this first hollow boss 414. The tongue-like engagement piece portions 4145 are formed in these slots 4147, respectively. Inner surfaces of the engagement piece portions 4145 extend along an inner peripheral surface of a shaft hole 4148 in the first hollow boss 414.

In this third exemplary, non-limiting embodiment of the present invention, the stator coil 424 is mounted on a printed circuit board 45, and simultaneously when the printed circuit board 45 is mounted within a lower half portion 41D, the stator coil 424 is fitted on the first hollow boss 414, as described above for the second embodiment. At this time, each of the keys 4246 advances in and along the corresponding slot 4147 while elastically deforming the corresponding engagement piece portion 4145 radially inwardly. Then, when the keys 4246 abut respectively against lower end surfaces of the slots 4147, the engagement piece portions 4145 are elastically restored radially outwardly, so that the hooks 4146 are brought into engagement with the upper edge of the core 4241, and therefore the stator coil 424 is mounted on the first hollow boss 414 in such a manner that the stator coil 424 is held against movement in the axial direction.

At this time, the stator coil 424 is positioned in the circumferential direction and axial direction by the keys 4246 and the slots 4147. The disengagement of the stator coil 424 from the first hollow boss 414 is prevented by the hooks 4146 of the engagement piece portions 4145 engaged with the upper edge of the stator coil 424. Therefore, in this third exemplary, non-limiting embodiment, some time and labor are required for mounting the stator coil 424 on the printed circuit board 45, but when the stator coil 424 is thereafter mounted within the housing, the stator coil 424 is highly precisely located relative to the first hollow boss 414, and also is stably and highly precisely located relative to a rotor 426 mounted on the first hollow boss 414.

In this third exemplary, non-limiting embodiment, when a sleeve bearing 422 is press-fitted into the shaft hole 4148 in the first hollow boss 414 after the stator coil 424 is fitted on the first hollow boss 414, the inner surfaces of the engagement piece portions 4245 are held in contact with an outer peripheral surface of the sleeve bearing 422, so that the engagement piece portions 4245 are prevented from being elastically deformed radially inwardly, and therefore the hooks 4246 will not be disengaged from the upper edge of the stator coil 424, thereby positively preventing the disengagement of the stator coil 424.

In the above embodiments, although the projector lamp is angularly moved by the actuator of the invention, the invention can, of course, be applied to the type of AFS in which a reflector is angularly moved to deflect an optical axis of illumination of a lamp. Also, the invention can be applied to the type of AFS in which part of a swivel lamp is angularly moved in a controlled manner to control the range of illumination of the lamp.

In the above embodiments, although the brushless motor of the invention is used as the actuator for driving the swivel lamp of the AFS, the brushless motor can be used for other purposes.

The present invention has various advantages. For example, but not by way of limitation, as described above, in the present invention, the casing of the actuator is molded of the resin, and therefore the lightweight design and low-cost design can be achieved. The channel-shaped groove is formed in the outer surface of the thickened peripheral edge portion of the casing having the step-like rib formed at the inner surface thereof, so that the opposed rib is formed. Therefore, in the resin-molding of the casing, an uneven flow of the resin in the region for forming the peripheral edge portion is prevented, and as a result warp is prevented from developing at the peripheral edge portion of the casing. Thanks to the provision of the step-like rib, there is no need to provide an additional support member for supporting the component part, and the board can be fixedly supported directly by the casing.

Also, the opposed rib does not project beyond the outer surface of the casing, therefore the outer size of the casing is prevented from increasing, and the casing can be formed into a compact design. The gear of the gear mechanism is made of the self-lubricating resin, and therefore the gear mechanism does not need to be provided with grease, and the fogging of the lamp due to grease is prevented. Thus, the lightweight design, compact design and low-cost design of the actuator can be achieved, and the assembling efficiency can be enhanced.

Further, in the present invention, the yoke of the rotor and the gear are formed integrally with each other, using the resin, and these are supported on the rotation shaft in a fitted condition. Therefore, the number of the component parts of the rotor is reduced, and the time and labor, required for assembling the rotor, are reduced. As a result, the cost of the parts and the cost of the assembling operation are reduced, so that the low-cost design of the motor can be achieved. And besides, press-fitting margins for the purpose of press-fitting the relevant parts do not need to be provided on the rotation shaft, and therefore the axial dimension of the rotation shaft can be reduced, which is advantageous in achieving the compact design.

Furthermore, the yoke and the gear are made of the resin, and therefore the lightweight design can be achieved, and this also prevents the vibration during the high-speed rotation, so that a rotation balance can be improved, thereby enhancing the rotation characteristics.

Additionally, in the present invention, before the stator coil of the brushless motor is mounted on the board, the core base is beforehand integrally connected to the core, and the terminals of the coils are connected to the terminals, and then the terminals of the core base are connected to the board, thereby mounting the stator coil on the board. With this construction, the stator coil can be easily mounted on the board, and also the positioning of the stator coil relative to the board can be effected highly precisely by the core base, so that the stator coil can be stably and highly precisely mounted relative to the rotor.

Further, in the invention, when the stator coil is fitted on the boss supporting the rotation shaft, the positioning of the stator coil is effected by the positioning means for positioning it in the circumferential and axial directions, and the stator coil is supported on the boss through the engagement means. Therefore, the mounting of the stator coil can be effected easily, and besides the stator coil can be highly precisely located relative to the boss, and can also be highly precisely located relative to the rotor mounted on the boss.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A vehicle headlamp unit comprising:
   luminous distribution control means for controlling a direction or a range of illumination by light from a light source, and
   an actuator for driving said luminous distribution control means, said actuator comprising,
   a resin-molded casing, and
      a gear mechanism and a board contained in said resin-molded casing,
      said resin-molded casing including,
   a step-like rib formed at an inner side of a peripheral edge portion of said casing, and
   an opposed rib, formed at an outer side of said peripheral edge portion, extending along a channel-shaped groove recessed toward said step-like rib.

2. The vehicle headlamp unit according to claim 1, wherein at least one of a plurality of gears of said gear mechanism is made of a resin having self-lubricating properties.

3. The vehicle headlamp unit according to claim 1, wherein the step-like rib supports at least one of said gear mechanism and said board.

4. A vehicle headlamp unit comprising:
luminous distribution control means for controlling a direction or a range of illumination by light from a light source, and
an actuator for driving said luminous distribution control means, said actuator comprising,
a resin-molded casing,
   a gear mechanism contained in said resin-molded casing, and
   a brushless motor, and
wherein said brushless motor comprising:
   a stator coil fixedly-supported to one of a casing and a board;
   a rotor, including a yoke that supports a rotor magnet provided around said stator coil, connected to a rotation shaft, and
   a gear connected to said rotation shaft and in mesh with a gear mechanism, and
wherein said yoke and said gear are formed integrally with each other and are made of a resin.

5. The vehicle headlamp unit according to claim 4, wherein said yoke is connected to said rotation shaft by insert-molding said rotation shaft substantially directly in said yoke.

6. The vehicle headlamp unit according to claim 4, wherein said yoke has a cylindrical container-shape;
said rotor magnet has an annular shape, and is mounted on an inner peripheral surface of said yoke;
said gear is formed integrally on a central portion of an outer end surface of said yoke;
a shaft hole is formed through said gear to extend along a centerline of said gear, and
said rotation shaft is passed through said shaft hole in a fitted condition.

7. A vehicle headlamp unit comprising:
luminous distribution control means for controlling a direction or a range of illumination by light from a light source, and
an actuator for driving said luminous distribution control means, said actuator comprising,
a resin-molded casing,
   a gear mechanism contained in said resin-molded casing, and
   a brushless motor, and
wherein said brushless motor comprising:
   a stator coil fixedly supported to one of a casing and a board by a fixing means, and
   a rotor, including a yoke which supports a rotor magnet provided around said stator coil, connected to a rotation shaft,
wherein said fixing means has a positioning structure for positioning said stator coil.

8. A vehicle headlamp unit comprising:
luminous distribution control means for controlling a direction or a range of illumination by light from a light source, and
an actuator for driving said luminous distribution control means, said actuator comprising,
a resin-molded casing,
   a gear mechanism contained in said resin-molded casing, and
   a brushless motor, and
wherein said brushless motor comprising:
   a stator coil;
   a rotor, including a yoke which supports a rotor magnet provided around said stator coil, connected to a rotation shaft, and
   a core base, integrally connected to a core of said stator coil, for supporting said stator coil on a board;
wherein said core base includes:
engagement means for integrally connecting said core base to said core, and
terminals for supporting said core base on said board and for electrically connecting coils, wound on said core, to said board.

9. A vehicle headlamp unit comprising:
luminous distribution control means for controlling a direction or a range of illumination by light from a light source, and
an actuator for driving said luminous distribution control means, said actuator comprising,
a resin-molded casing,
   a gear mechanism contained in said resin-molded casing, and
   a brushless motor, and
wherein said brushless motor comprising:
   a stator coil fixedly-supported to a casing or a board by a fixing means, and
   a rotor, including a yoke which supports a rotor magnet provided around said stator coil, connected to a rotation shaft,
   wherein said stator coil can be fitted on a boss formed at a casing and supporting said rotation shaft, said boss including means for positioning said stator coil in a circumferential direction and an axial direction, and engagement means for holding a core of said stator coil in an axial direction of said boss.

* * * * *